(12) United States Patent
Overgaard et al.

(10) Patent No.: US 11,630,469 B2
(45) Date of Patent: Apr. 18, 2023

(54) CONTROL SYSTEM AND METHOD FOR CONTROLLING A FLUID DISTRIBUTION SYSTEM

(71) Applicant: GRUNDFOS HOLDING A/S, Bjerringbro (DK)

(72) Inventors: Anders Overgaard, Bjerringbro (DK); Brian Kongsgaard Nielsen, Bjerringbro (DK); Carsten Skovmose Kallesøe, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 526 days.

(21) Appl. No.: 16/860,260

(22) Filed: Apr. 28, 2020

(65) Prior Publication Data
US 2020/0340689 A1    Oct. 29, 2020

(30) Foreign Application Priority Data

Apr. 29, 2019  (EP) .................................... 19171625

(51) Int. Cl.
*F24F 11/70*    (2018.01)
*G05D 7/06*    (2006.01)
(Continued)

(52) U.S. Cl.
CPC ............. *G05D 7/0664* (2013.01); *F24D 3/10* (2013.01); *F24D 19/1015* (2013.01);
(Continued)

(58) Field of Classification Search
CPC ... Y10T 137/87877; F24F 3/048; F24F 11/70; F24F 2110/10; F24F 2110/40;
(Continued)

(56) References Cited

U.S. PATENT DOCUMENTS 8,024,161 B2 *   9/2011   Pekar .................. F24D 19/1015
                                                                  700/282
9,754,055 B1 *   9/2017   Glendinning ........... G06F 30/13
(Continued)

FOREIGN PATENT DOCUMENTS

DE      3529257 A1    2/1987
FR      2711775 A1    5/1995
WO   2016087057 A1    6/2016

*Primary Examiner* — William M McCalister
(74) *Attorney, Agent, or Firm* — McGlew and Tuttle, P.C.

(57) ABSTRACT

A control system controls a fluid distribution system that includes consumer branches arranged in parallel. Each consumer branch includes a consumer element (31) consuming fluid and/or thermal energy, a regulating device (9) receiving a control value regulating a flow of fluid and/or thermal energy through the consumer branch, and a sensor (11) providing a measured value of the consumer branch. The control system includes a saturation calculation module (21) providing a saturation value, for each operational consumer branch, indicative of the saturation degree of the associated consumer branch, and a saturation compensation module (23) receiving the saturation values and altering a reference value. The altered reference value is based on an initial reference value and the saturation values from all consumer branches. The consumer branch regulating device, of each operational consumer branch, is controllable based on the altered reference value and the measured value of the associated consumer branch.

23 Claims, 22 Drawing Sheets

(51) Int. Cl.
  *F24D 3/10* (2006.01)
  *F24D 19/10* (2006.01)
  *F24F 3/048* (2006.01)
  *F24F 110/40* (2018.01)
  *F24F 110/10* (2018.01)

(52) U.S. Cl.
  CPC .............. *F24F 3/048* (2013.01); *F24F 11/70* (2018.01); *F24F 2110/10* (2018.01); *F24F 2110/40* (2018.01); *Y10T 137/87877* (2015.04)

(58) Field of Classification Search
  CPC .... G05D 7/0664; G05D 23/1934; F24D 3/10; F24D 19/1015; F24D 19/1012; G05B 19/0423; G05B 2219/23051; F04D 13/0686; F04D 15/0066; F04D 15/0088; H04L 12/1854
  USPC .................................. 137/883; 700/277, 278
  See application file for complete search history.

(56)  References Cited

U.S. PATENT DOCUMENTS

| | | | |
|---|---|---|---|
| 10,417,596 B2* | 9/2019 | Varadi | F24F 11/58 |
| 10,655,879 B2* | 5/2020 | Muramatsu | F24F 11/89 |
| 2003/0014161 A1* | 1/2003 | Orthlieb | G05D 23/1934 |
| | | | 700/282 |
| 2003/0182021 A1* | 9/2003 | Kidder | G05D 23/1934 |
| | | | 700/277 |
| 2006/0161307 A1* | 7/2006 | Patel | F24F 11/30 |
| | | | 700/277 |
| 2008/0294291 A1* | 11/2008 | Salsbury | F24F 11/30 |
| | | | 700/277 |
| 2009/0287355 A1* | 11/2009 | Milder | F24F 3/06 |
| | | | 700/282 |
| 2010/0163633 A1* | 7/2010 | Barrett | F24F 13/082 |
| | | | 236/51 |
| 2015/0369494 A1* | 12/2015 | Skovmose Kallesøe | F24D 19/1015 |
| | | | 165/247 |
| 2015/0370927 A1* | 12/2015 | Flaherty | F24F 11/58 |
| | | | 703/1 |
| 2017/0067656 A1* | 3/2017 | Guidetti | F24D 19/1015 |
| 2017/0067662 A1* | 3/2017 | Guidetti | F24F 1/0007 |
| 2017/0234559 A1* | 8/2017 | Federspiel | F24F 11/32 |
| | | | 700/278 |
| 2017/0276571 A1* | 9/2017 | Vitullo | G06Q 10/06 |
| 2018/0156470 A1* | 6/2018 | Olsen | F24D 3/105 |
| 2018/0239371 A1* | 8/2018 | Drees | F16K 11/0873 |
| 2019/0072292 A1* | 3/2019 | Froemke | F24F 11/84 |
| 2019/0353384 A1* | 11/2019 | Laughman | F24F 11/63 |
| 2020/0340689 A1* | 10/2020 | Overgaard | G05D 23/1934 |

* cited by examiner

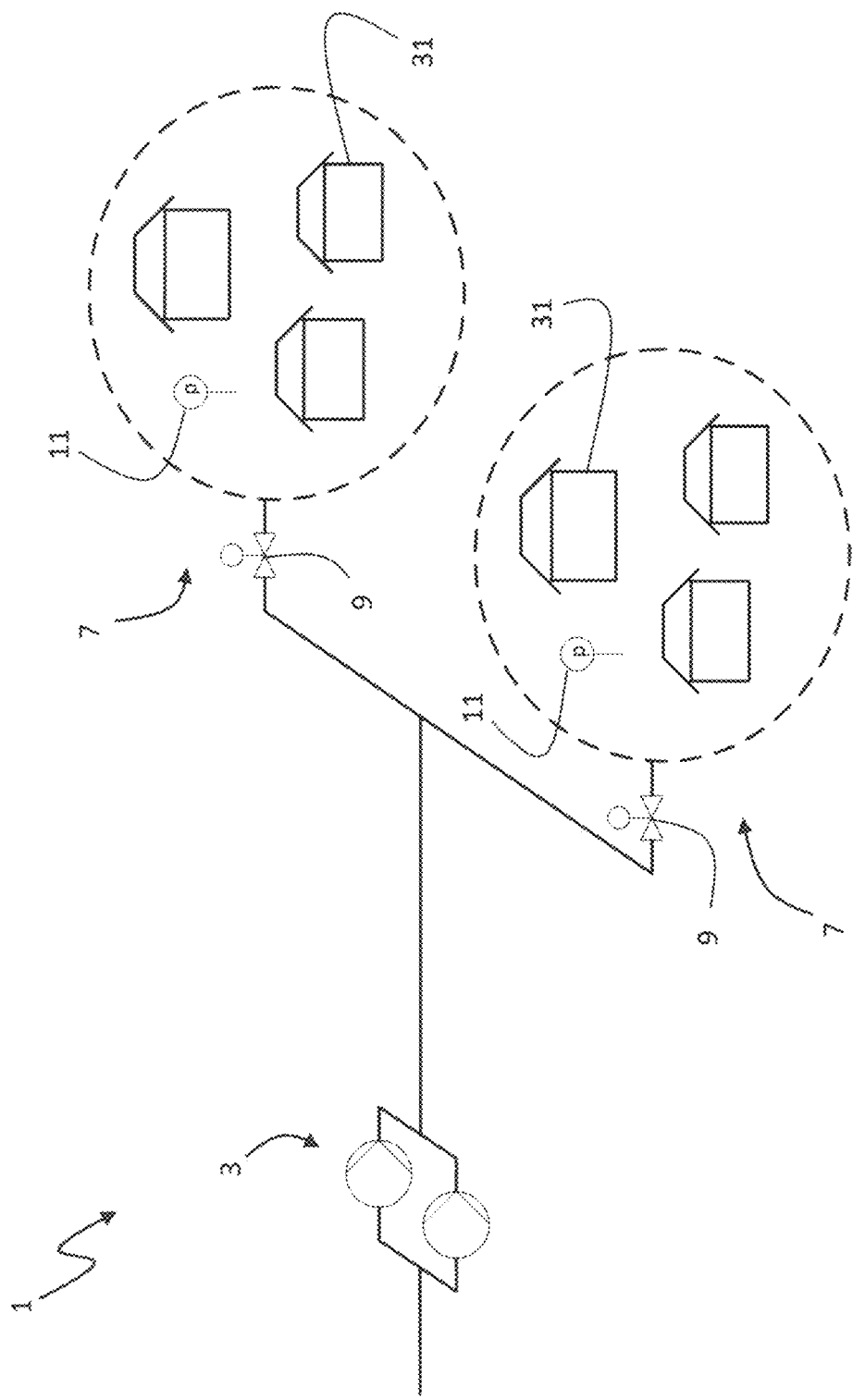

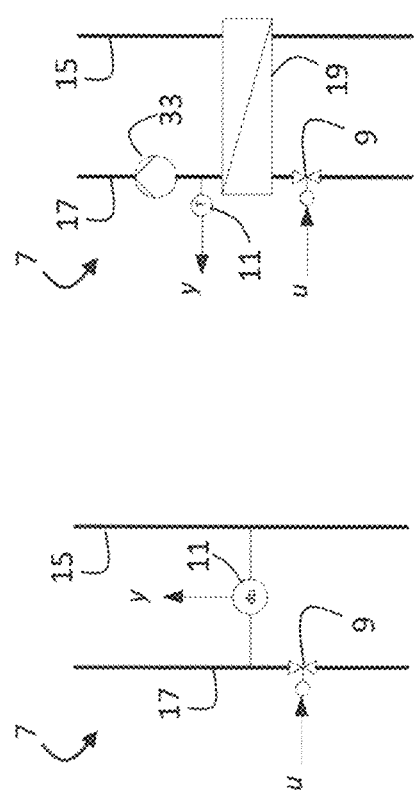
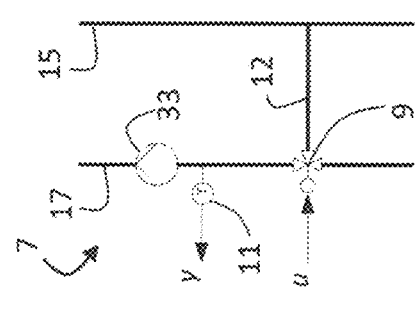
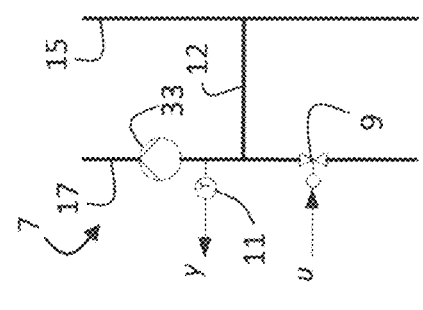
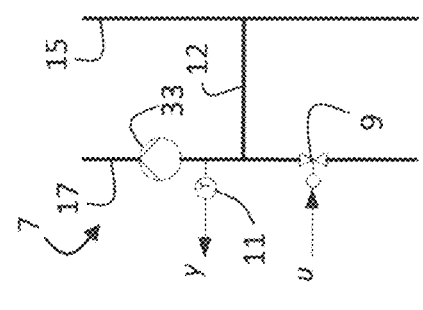
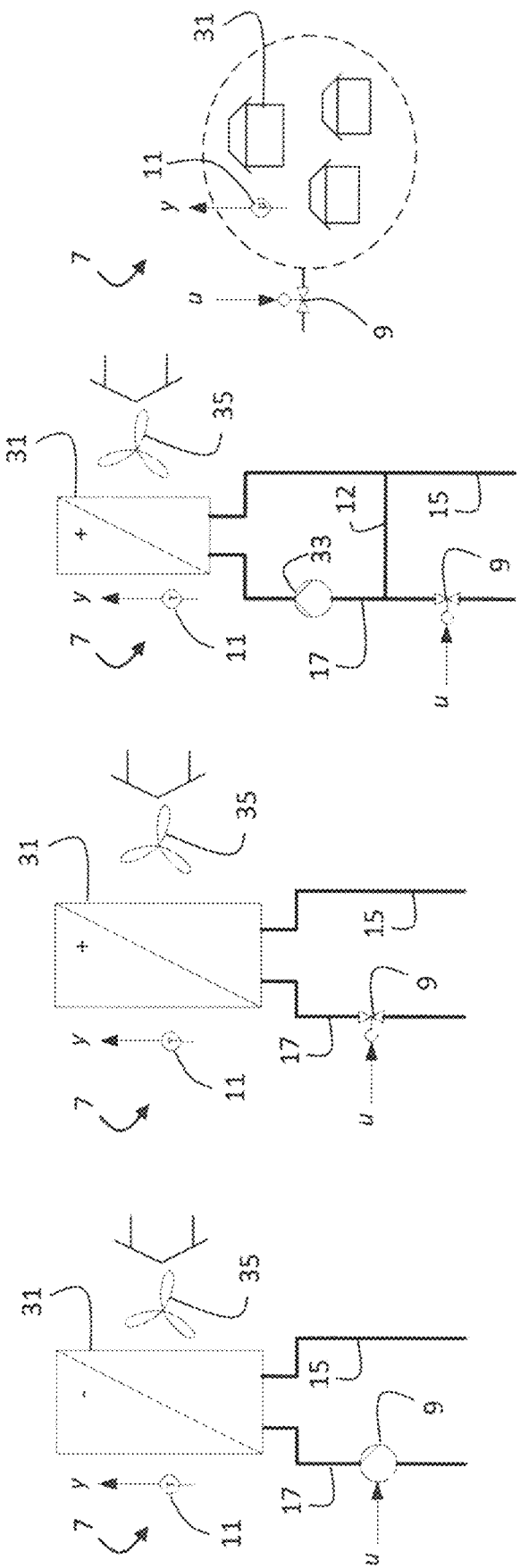
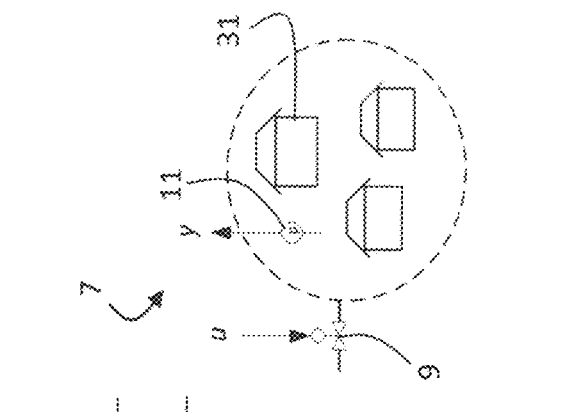
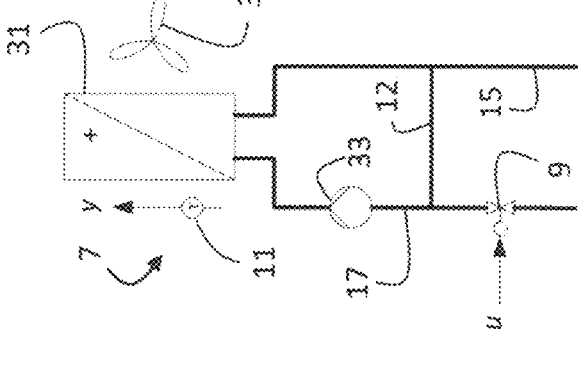
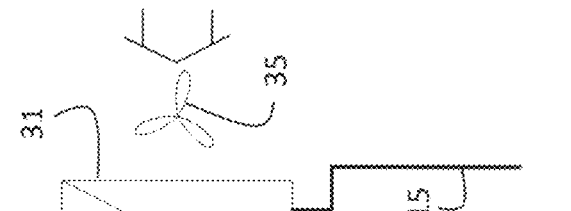

CONTROL SYSTEM AND METHOD FOR CONTROLLING A FLUID DISTRIBUTION SYSTEM

CROSS REFERENCE TO RELATED APPLICATIONS

This application claims the benefit of priority under 35 U.S.C. § 119 of European Application 19 171 625. 7, filed Apr. 29, 2019, the entire contents of which are incorporated herein by reference.

TECHNICAL FIELD

The present disclosure is directed to a control system and a method for controlling a fluid distribution system, in particular for use in a heating, cooling, ventilating, and/or air-conditioning (HVAC) system of a building.

BACKGROUND

For instance, a fluid distribution system may be a hydronic system for transporting thermal energy and/or a water supply system for transporting water from a source to a consumer. Typically, such fluid distribution systems comprise at least two consumer branches being arranged in parallel to each other, wherein each of the consumer branches comprises at least one consumer element for consuming fluid and/or thermal energy. The consumer branches may be fed by a feeder branch, wherein the feeder branch comprises a source element for providing a total flow of fluid and/or thermal energy.

It is a challenge to distribute the total flow of fluid and/or thermal energy among the parallel consumer branches in such a way that no consumer branch is "starving". For example, during a start-up of a heating system in the morning after a cold night, the overall demand of thermal energy may exceed the total available flow of thermal energy for a certain period of time. It is likely that certain consumer branches would be fed with a maximum flow of thermal energy while other consumer branches would get a minimum or zero flow of thermal energy despite their high demand.

WO 2016/087057 A1 describes a system for balancing a heating system, wherein a hydraulic model of the heating system is established in test runs with only one open hydraulic line at a time. Based on the hydraulic model, balancing valves of the hydraulic lines are adjusted to meet a desired flow rate for each hydraulic line. A starvation of hydraulic lines is thereby prevented from happening in the first place as long as the hydraulic model matches the real heating system.

The system as described in WO 2016/087057 A1 has the disadvantage that it does not automatically recognise whether the hydraulic model still matches the real heating system or not. The hydraulic model must be re-established regularly and/or upon user command in order to keep it up-to-date with the real system.

SUMMARY

The control system according to the present disclosure provides an automatic solution without establishing a hydraulic model that requires regular updates.

According to a first aspect of the present disclosure, a control system for controlling a fluid distribution system is provided, wherein the fluid distribution system comprises at least two consumer branches being arranged in parallel to each other, wherein each of the at least two consumer branches comprises at least one consumer element for consuming fluid and/or thermal energy, at least one consumer branch regulating device configured to receive a control value for regulating a flow of fluid and/or thermal energy through the associated consumer branch, and at least one sensor for providing a measured value of the associated consumer branch. The control system comprises a saturation calculation module being configured to provide a saturation value for each operational consumer branch, wherein the saturation value is indicative of the saturation degree of the associated consumer branch, and a saturation compensation module being configured to receive the saturation values and to alter a reference value, wherein the altered reference value is based on an initial reference value and the saturation values from all consumer branches, so that the at least one consumer branch regulating device of each operational consumer branch is controllable based on the altered reference value and the measured value of the associated consumer branch, preferably on a comparison between them.

The terms "saturation" or "saturate" used herein shall refer to a situation in which the control range of a regulation device reaches a limit so that the measured value ceases to approach towards a target value. When a proportional, integral and/or derivative controller (P, I, D, PI, or PID controller) is used, this phenomenon is also known as integrator windup. The controller repetitively calculates an error value indicative of the deviation between a measured value and a target value, but the error value cannot be reduced anymore when the "saturation" is reached. For instance, a temperature cannot be increased anymore towards a target temperature by a heating system branch even when the valves in that branch are fully opened and/or the pumps in that branch are running at full power. A "saturation" of a consumer branch is therefore equivalent to a "starvation" of that consumer branch, because a saturated consumer branch does not get the "requested" flow of fluid and/or thermal energy.

This means that the system described herein provides some sort of distributed feedback control mechanism which automatically detects an already happened or about to happen saturation of a consumer branch and then automatically balances the flow among all open consumer branches to compensate for the saturation or starvation. This automatic balancing may come at a cost of a slightly lower sum of flows of fluid and/or thermal energy through all open consumer branches, but makes sure that none of the open consumer branches keep starving.

Optionally, at least one of the consumer branch regulating device(s) may be a pump or a regulating valve. Optionally, the at least one of the sensor(s) may be a temperature sensor, a pressure sensor, and/or a flow sensor. Optionally, the at least one consumer branch regulating device is configured to be controlled in a closed-loop manner according to the control value. The term "closed-loop" shall mean herein that the effect of the control value on the flow and thus the deviation of the measured value from the altered reference value is used as a feedback value to be minimized. A controller of the flow regulating device, i.e. the pump and/or the valve, may thus be denoted as a feedback controller. The closed-loop control is not event-triggered, but essentially continuous or regular, which means that, also during "stable" operation of the flow distribution system, the controllers receive and/or determine essentially continuously or regularly a deviation of the measured value from the (altered) reference value and adapts essentially continuously or regularly the flows accordingly. The flows may stabilise when the deviation is close to zero or at a minimum that does not indicate a "starving". A relatively high deviation over a certain period of time indicates a starving.

In case of one consumer branch starving, the saturation calculation module may calculate a saturation value that indicates a high degree of saturation for the associated consumer branch based on a relatively high deviation of the received temperature sensor measurement from the reference temperature over a certain period of time in that consumer branch. Having received said saturation value, the saturation compensation module may then alter the reference temperature, wherein the altered reference temperature is based on the initial reference temperature and all calculated saturation values. The control value for each consumer branch may then be altered accordingly based on the altered reference temperature and the measured temperature of the associated consumer branch, preferably on a comparison between them. Effectively, e.g. in case of a cooling system, the reference temperature may be increased slightly and the total flow of thermal energy may be slightly decreased by reducing the thermal energy flow through one or more of the non-starving branches. The starving branch then gets a higher share of the thermal energy flow in order to mitigate the starving situation for that branch. It should be noted that this may temporarily induce a starving situation at another, more than one other or all of the branches. The initial reference temperature may be re-established during "stable" operation of the flow distribution system without starving branches.

Optionally, each saturation value may be based on an accumulation of deviations between a threshold value and the control value. For instance, the threshold value may be a 90% opening-degree of a regulating valve or 80% of maximum pumping power or speed of a pump. Alternatively, the threshold value may be a minimum slope amount $|\Delta y/\Delta u|_{min}$ or $|\Delta Q/\Delta u|_{min}$ or $|\Delta Q/\Delta y|_{min}$, i.e. a minimal expected change of the measured value $\Delta y$ or the thermal energy flow $\Delta Q$ for a certain change of the control value $\Delta u$. The saturation value may be an accumulation of control value deviations over time. Positive and negative deviations of the control value from the threshold value are preferably summed up to achieve a smooth behaviour of the saturation values for a smooth closed-loop control of the regulating device(s). In essence, if a valve is too open over a certain period of time or a pump is running at too high power or speed over a certain period of time, a starvation or saturation is indicated. An individual gain factor may be applied to each consumer branch for the accumulation in order to determine how much a saturated consumer branch shall benefit from other consumer branches that may share some flow with the starving consumer branch. The individual gain factor(s) may account for different intrinsic starving probabilities among the consumer branches. A consumer branch that is intrinsically more susceptible to starving, e.g. due to being further away from a feeder branch, may be attributed a higher gain factor than a consumer branch that is intrinsically less susceptible to starving, e.g. due to being closer to a feeder branch.

Optionally, a weighted sum of all saturation values may represent a relative or an absolute amount, wherein the altered reference value differs from the initial reference value by said relative or absolute amount. For instance, an initial reference temperature $T_0$ may be reduced to an altered reference temperature $T_{ref}$ according to the weighted sum of all saturation values representing the relative amount $T_{ref}/T_0$ or the absolute amount $|T_{ref}-T_0|$. In other words, the weighted sum of all saturation values may be representative of the share of flow that is to be re-distributed from the non-starving branches to the starving branches.

Optionally, the saturation calculation module may be configured to provide the saturation value for each operational consumer branch based on the measured value and/or the control value. Alternatively, or in addition, a valve position could be measured and used as an input variable for the determination of the saturation value. Alternatively, or in addition, a pump speed, pump power and/or pump pressure could be measured or estimated and used as an input variable to base the determination of the saturation value on.

Optionally, the saturation calculation module may be configured to determine if at least one of the consumer branches is operational before providing a saturation value. For instance, one or more of the consumer branches may be completely closed or shut down, and therefore do not need to participate in the flow sharing process. It is only useful to calculate the saturation value for a consumer branch if at least one other consumer branch is operational for which the saturation value is useful to be provided. Accordingly, the saturation value for that other consumer branch may be calculated and also provided.

Optionally, the saturation calculation module may be implemented in a consumer branch control unit at each of the consumer branches, wherein each consumer branch control unit is configured to communicate with all other consumer branch control units. In such an embodiment, the feedback control mechanism is a distributed network of a multitude of local consumer branch control units that may comprise essentially identical hardware. The local consumer branch control unit may be integrated into pump control electronics of a pump assembly in a consumer branch and/or into valve control electronics of a regulating valve unit in a consumer branch.

Optionally, the saturation compensation module may be implemented in a local consumer branch control unit at each of the consumer branches, wherein each consumer branch control unit is configured to control the at least one consumer branch regulating device of the associated operational consumer branch based on the altered reference value and the measured value of the associated consumer branch, preferably on a comparison between them. The local consumer branch control unit may be integrated into pump control electronics of a pump assembly in a consumer branch and/or into valve control electronics of a regulating valve unit in a consumer branch. Preferably, both the saturation calculation module and the consumer branch control unit may be integrated into the pump control electronics within the electronics housing of a pump assembly. In case of a regulating valve, both the saturation calculation module and the saturation compensation module may be integrated into control electronics within the electronics housing of a valve. Alternatively, or in addition, the saturation calculation module and/or the saturation compensation module may be implemented into the sensor electronics within the sensor housing of the at least one sensor at a consumer branch.

According to certain embodiments, the fluid distribution system may comprise a feeder branch comprising at least one source element for providing a total flow of fluid and/or thermal energy and at least one feeder branch regulating device for regulating the total flow of fluid and/or thermal energy through the feeder branch, wherein the feeder branch is arranged to feed the consumer branches with fluid and/or thermal energy. For such embodiments it is an option that the saturation compensation module may be implemented in a feeder branch control unit at the feeder branch, wherein the feeder branch control unit is configured to receive the saturation values from consumer branch control units at each operational consumer branch, so that the at least one feeder branch regulating device is controllable based on the altered reference value and a value measured by a sensor in the feeder branch, preferably on a comparison between them.

According to a second aspect of the present disclosure, a fluid distribution system is provided comprising
at least two consumer branches being arranged in parallel to each other, wherein each of the at least two consumer branches comprises at least one consumer element for consuming fluid and/or thermal energy, at least one consumer branch regulating device configured to receive a control value for regulating the flow of fluid and/or thermal energy through the associated consumer branch, and at least one sensor for providing a measured value of the associated consumer branch, and
a control system as described above.

According to a third aspect of the present disclosure, a method for controlling a fluid distribution system is provided, the method comprising the steps:
consuming a fluid and/or thermal energy by at least one consumer element in each of at least two consumer branches being arranged in parallel to each other,
regulating a flow of fluid and/or thermal energy through each of the consumer branches by at least one consumer branch regulating device in each consumer branch based on a control value of the associated consumer branch,
providing a measured value for each consumer branch by at least one sensor in each consumer branch,
determining a saturation value for each consumer branch, wherein the saturation value is indicative of the saturation degree of the associated consumer branch,
altering a reference value, wherein the altered reference value is based on an initial reference value and the saturation values from all consumer branches, and
controlling the at least one consumer branch regulating device of each consumer branch based on the altered reference value and the measured value of the associated consumer branch, preferably on a comparison between them.

Optionally, at least one of the consumer branch regulating device(s) may be a pump or a valve.

Optionally, the step of providing a measured value for each consumer branch may comprise providing an absolute or differential temperature value, an absolute or differential pressure value, and/or an absolute or differential flow value.

Optionally, determining the saturation value for each consumer branch may be based on the measured value and/or the control value. Alternatively, or in addition, a valve position could be measured and used as an input variable for the determination of the saturation value. Alternatively, or in addition, a pump speed, pump power and/or pump pressure could be measured or estimated and used as an input variable to base the determination of the saturation value on.

Optionally, the step of regulating the flow of fluid and/or thermal energy through each of the consumer branches may include controlling the associated consumer branch regulating device in a closed loop manner according to the control value.

Optionally, the step of determining the saturation value may be based on an accumulation of deviations between a threshold value and the control value.

Optionally, a weighted sum of all saturation values may represent a percentage or an absolute amount, wherein the altered reference value differs from the initial reference value by said percentage or said absolute amount.

Optionally, the method may further comprise a step of determining if at least one of the consumer branches is operational before providing a saturation value.

Optionally, the saturation calculation module may be implemented in a consumer branch control unit at each of the consumer branches, wherein the method further comprises a step of communicating by each consumer branch control unit with all other consumer branch control units.

Optionally, the saturation compensation module may be implemented in a consumer branch control unit at each of the consumer branches, wherein the method further comprises a step of controlling the at least one consumer branch regulating device of an associated operational consumer branch based on the altered reference value and the measured value of the associated consumer branch, preferably on a comparison between them.

Optionally, the method may further comprise the steps of:
providing fluid and/or thermal energy by at least one source element in a feeder branch, wherein the feeder branch is arranged to feed each consumer branch with fluid and/or thermal energy,
regulating a flow of fluid and/or thermal energy through the feeder branch by at least one feeder branch regulating device,
receiving the saturation values from consumer branch control units at each operational consumer branch by a feeder branch control unit at the feeder branch, and
controlling the at least one feeder branch regulating device based on the altered reference value and a value measured by a sensor in the feeder branch, preferably on a comparison between them.

The method disclosed herein may be implemented in form of compiled or uncompiled software code that is stored on a computer readable medium with instructions for executing the method. Alternatively, or in addition, the method may be executed by software in a cloud-based system and/or a building management system (BMS), e.g. in the control system disclosed herein.

The control system and method described herein may be implemented and integrated in local decentral consumer branch control units located at, in or close to the regulating devices of the consumer branches, and being in communication with each other by a network. Alternatively, or in addition, the control system and method described herein may be implemented and integrated in at least one central controller controlling the regulating devices in the consumer branches via a network, e.g. as part of a building management system (BMS). It is also possible to implement the control system and method described herein at least partially in a remote cloud computing environment. For instance, at least the determination and broadcasting of saturation values may be performed in a remote cloud computing environment. A cloud computing environment may be particularly useful in case of geographically widely spread fluid distribution systems, such as a municipal water supply system or a district heating or cooling system.

Embodiments of the present disclosure will now be described by way of example with reference to the following figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a schematic view of a water supply network with two different valve-controlled parallel pressure zones as an example of a fluid distribution system for which the present disclosure is applicable;

FIGS. 9a-h show eight schematic views of different examples of closed-loop controlled consumer elements according to the present disclosure;

DESCRIPTION OF PREFERRED EMBODIMENTS

Figure 1:
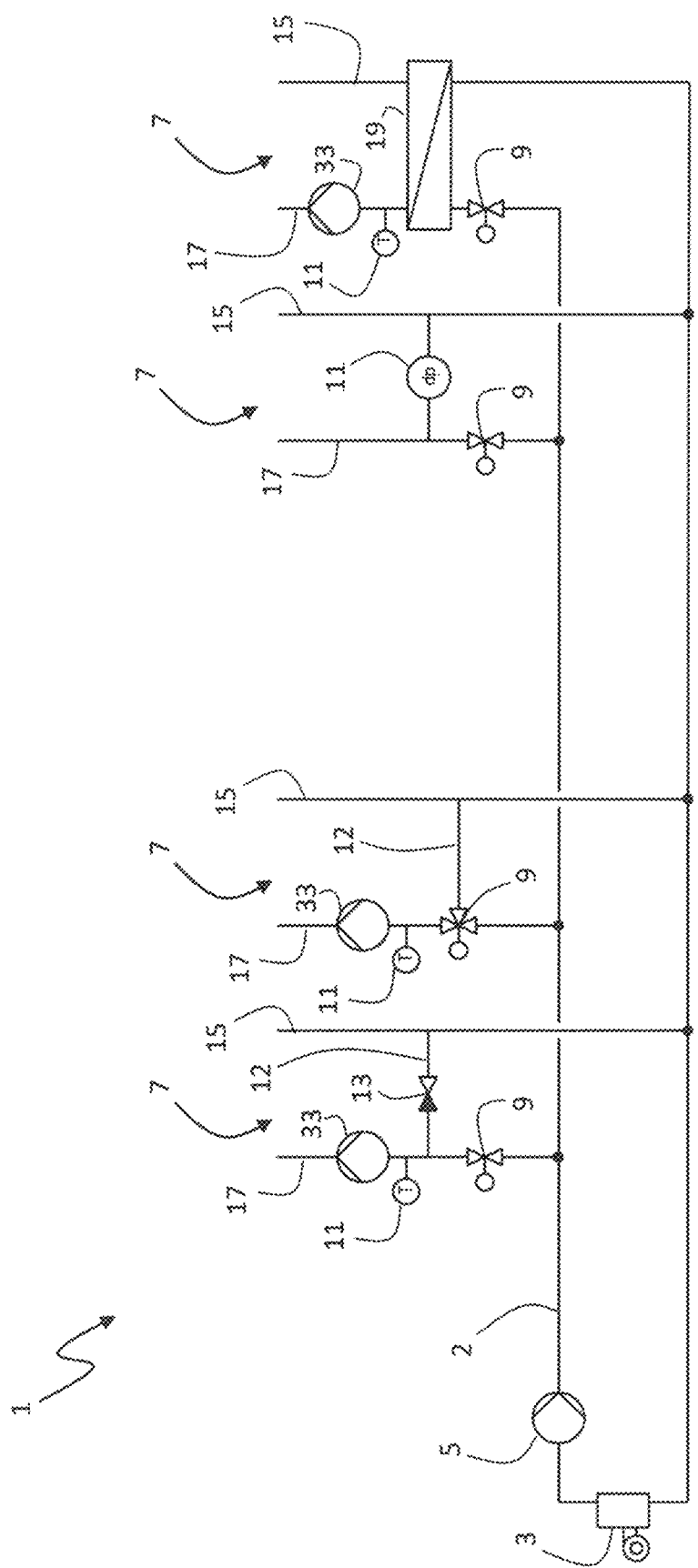
FIG. 1 is a schematic view of a heating system with four different valve-controlled parallel consumer branches as an example of a fluid distribution system for which the present disclosure is applicable.

Referring to the drawings, FIG. 1 shows a fluid distribution system 1 in form of a heating system comprising a feeder branch 2 with a source element 3 in form of a heat source like a hot water boiler. The feeder branch 1 further comprises a feeder branch regulating device 5 in form of a pump for pumping hot water through the feeder branch 1. Four different consumer branches 7 are connected to the feeder branch 1 in parallel to each other, so that the flow of hot water through the feeder branch 1 is split among the four consumer branches 7. Each of the consumer branches 7 comprises at least one consumer branch regulating device 9 in form of a valve and/or a pump. From left to right in FIG. 1, the first consumer branch 7, the second consumer branch 7 and the fourth consumer branch 7 have a valve as the consumer branch regulating device 9 for regulating the hot water flow into the respective consumer branch and a pump 33 for circulating fluid in the respective consumer branch. The third consumer branch 7 comprises a valve as the consumer branch regulating device 9, but no circulation pump. Furthermore, each of the consumer branches 7 comprises at least one sensor 11 for providing a measured value of the associated consumer branch 7. From left to right in FIG. 1, the first consumer branch 7, the second consumer branch 7 and the fourth consumer branch 7 have a temperature sensor 11, whereas the third consumer branch 7 has a differential pressure sensor 11. Finally, each of the consumer branches 7 comprises at least one consumer element (not shown in FIG. 1) per consumer branch for consuming thermal power, e.g. a radiator. The first consumer branch 7 comprises a bypass 12 with a check valve 13 for preventing a hot water flow directly to a return line 15 of the first consumer branch 7. The check valve 13 prevents an undesirable back-flow of water from a feed line 17 into the return line 15 of the first consumer branch 7. The second consumer branch 7 has a three-way valve 9 as consumer branch regulating device without the need for an extra check valve. The third consumer branch 7 without a bypass is fully controlled by the valve 9, wherein the differential pressure dp between a return line 15 of the third consumer branch 7 and a feed line 17 of the third consumer branch 7 is measured by the differential pressure sensor 11. The fourth consumer branch 7 comprises a heat exchanger 19 instead of a bypass for a thermal energy transfer into the fourth consumer branch 7.

It is important to note that each of the consumer branch regulating devices 9 is closed-loop controlled, wherein the value measured by the associated sensor 11 is used as a feedback value for the closed-loop control. For instance, the valves 9 in first, second and fourth consumer branch 7 may be closed-loop controlled to establish a target temperature in the feed lines 17. The valve 9 of the third consumer branch 7 may receive a measured pressure differential from the sensor 11 and may be closed-loop controlled to establish a target pressure differential between a return line 15 of the third consumer branch 7 and a feed line 17 of the third consumer branch 7. The closed-loop control for each consumer branch 7 is trying to minimise the deviation or "error" between a pre-determined reference target value and the actual value measured by the sensor 11.

A fluid distribution system 1 as shown in FIG. 1 may face the problem that one or more of the consumer branches 7 consumes such a high portion of hot water flow provided by the feeder branch 2 that one or more of the other consumer branches 7 do not get enough hot water flow to achieve their target, i.e. they "starve". The closed-loop control of those starving consumer branches 7 would result in a "saturation" situation, wherein the deviation or "error" between a pre-determined reference target value and the actual value measured by the sensors 11 cannot be reduced any further and "settles" at an undesirably high value. The occurrence of such a "starvation" or "saturation" situation is most likely when, for instance, a building is heated up in the morning when switching from night mode to day mode or in extreme high demand situations. There is principally no difference between heating and cooling systems in this regard, so that the problem is principally same for heating and cooling systems.

Figure 2:
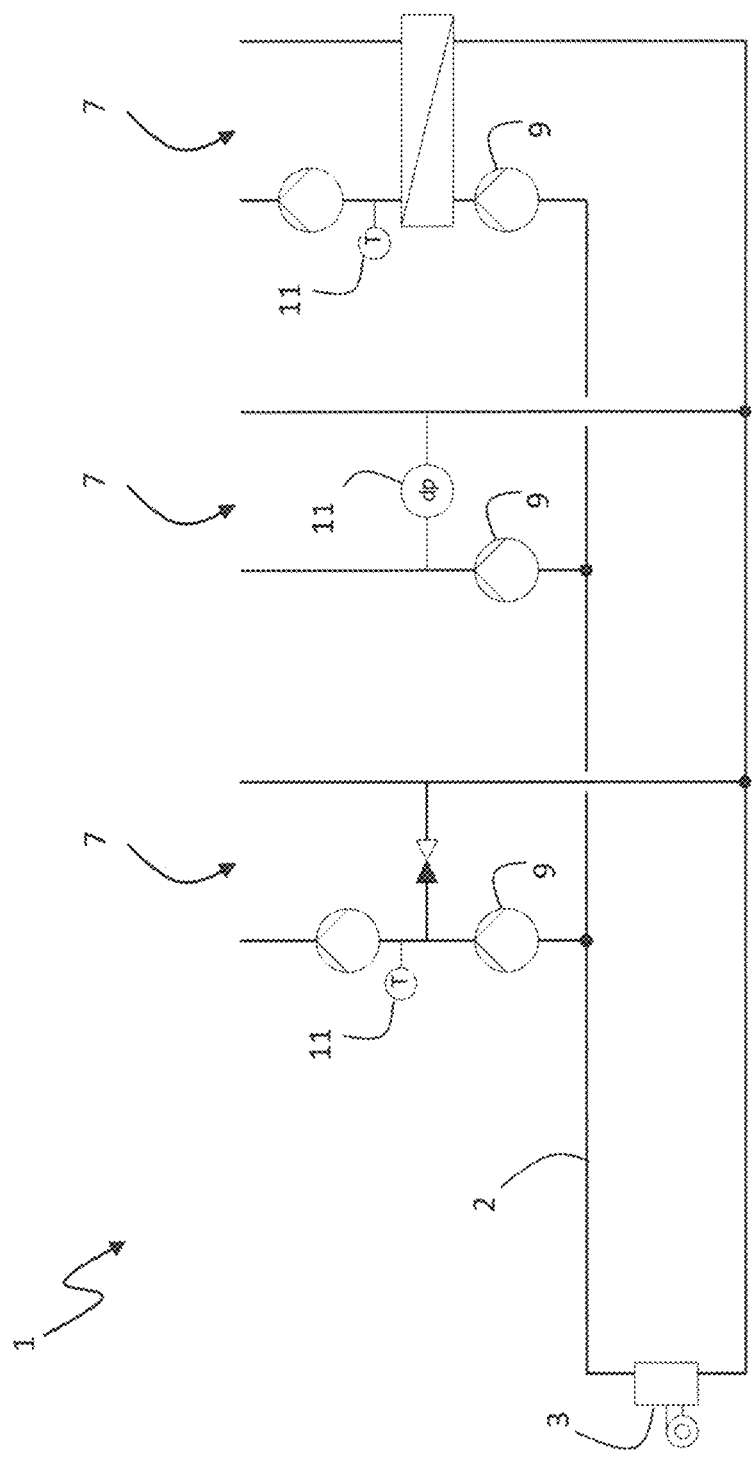
FIG. 2 is a schematic view of a heating system with three different pump-controlled parallel consumer branches as an example of a fluid distribution system for which the present disclosure is applicable.

FIG. 2 shows a heating system 1 similar to FIG. 1 with one consumer branch less and only pumps as consumer branch regulating devices 9. FIG. 3 shows a fluid distribution system 1 in form of a municipal water supply system with a pumping station as a source element 3 in a feeder branch 2 for supplying water to two parallel pressure zones as consumer branches 7. The consumer branches 7 have households as consumers elements 31 consuming water. The water pressure in the consumer branches 7 is measured by pressure sensors 11 and closed-loop controlled by pressure reducing valves as consumer branch regulating devices 9. The control system of the present disclosure is, inter alia, applicable to fluid distribution systems 1 as shown in FIGS. 1, 2 and 3 to solve the problem of occurring "starvation" or "saturation" situations.

The concept behind the solution provided by the present disclosure is not trying to "understand" the fluid distribution system 1 in test runs for modelling the system in order to be able to adjust the system for avoiding "starvation" or "saturation" situations in the first place. Instead, the concept is to automatically and quickly react to occurring or starting "starvation" or "saturation" situations in the closed-loop control of the consumer branch regulating devices. In other words, a saturation value indicative of the deviation or "error" between a pre-determined reference target value and the actual value measured is monitored over time for each consumer branch and the flow distribution is re-distributed among the consumer branches as soon as a saturation is indicated.

In order to be able to monitor the saturation value, it may be determined before as shown in FIGS. 4a-d with four different alternatives. FIGS. 4a-d therefore show four examples of principle functionalities of a saturation calculation module 21 of the control system according to the present disclosure. The input variable is in these examples always a control value u for the consumer branch regulating device 9. The control value u may be, for instance, a command value for a certain opening degree of a valve or a command value for a pumping power or speed of a pump. Alternatively, or in addition, it could be a measured or estimated opening degree of a valve or a measured or estimated pumping power or speed of a pump. Alternatively, the input variable may be a deviation or error value between a pre-determined reference target value and the actual value measured. For instance, the temperature error $\Delta T$ at which a controller may saturate, may be taken as input for calculating the saturation value $s_i$ or $v_i$.

Figure 4A:
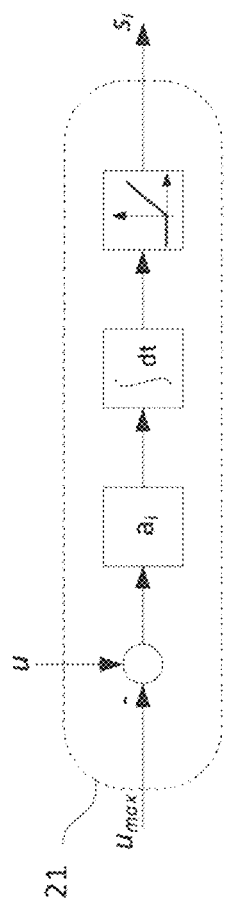
FIGS. 4a-d are four schematic views with different examples of determining the saturation value according to the present disclosure.

The input variable may be an absolute or relative value. In the shown examples, the control value u as input variable is compared with a threshold value $u_{min}$ or $u_{max}$. The appropriate way to determine the saturation value depends on the kind of closed-loop control and what saturation value is useful. In FIG. 4a, the threshold value $u_{max}$ is a maximum control value, e.g. an opening degree of 90% of a valve in a heating system. The difference between the input variable u and the threshold value $u_{max}$ is multiplied by a gain factor $a_i$ and accumulated or integrated over time to yield the saturation value $s_i$. The index i denotes here the consumer branch. If the integral is negative, the saturation value $s_i$ is set to zero. The gain factors $a_i$ may be pre-determined for each consumer branch in order to take differences among the consumer branches into account in view of their intrinsic susceptibility to saturation. For instance, the consumer branch furthest away from the feeder branch may be intrinsically more susceptible to saturation than the consumer branch closest to the feeder branch.

It is important to note that the accumulation or integration is applied irrespective of whether the threshold value $u_{max}$ is exceeded or not. Thus, the saturation value $s_i$ behaves smoothly and may be reset to zero if it becomes negative and the threshold value $u_{max}$ is not exceeded. The integrator reset may be useful to prevent a windup to large negative saturation values $s_i$ in a stable situation and to prevent a degradation of the sensitivity for saturation over time.

Figure 4B:
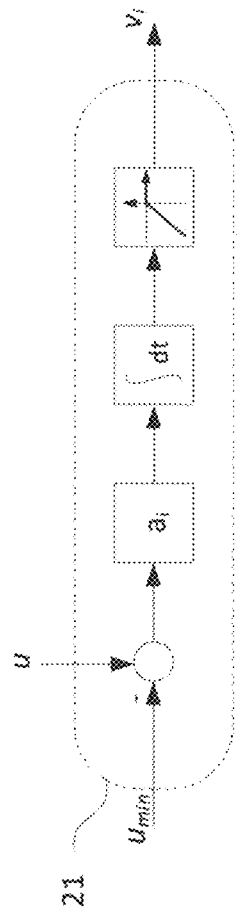
Figure 4C:
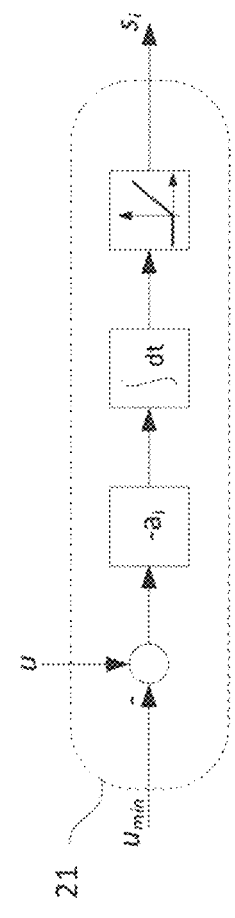
Figure 4D:
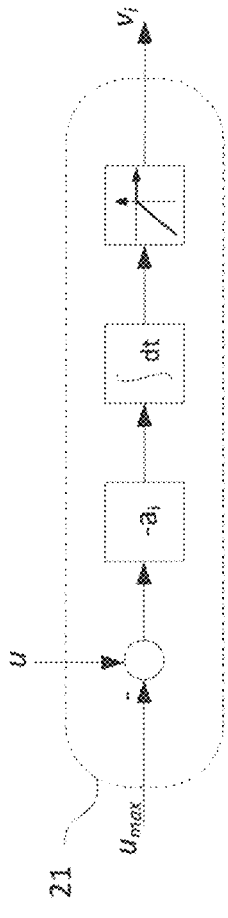

In saturation calculation module 21 of FIG. 4b, the threshold value $u_{min}$ is a minimum control value, e.g. a pumping power of 10% of a pump in a chiller system. In order to maintain a minimum fluid flow through the chillers, the accumulated saturation value $v_i$ is negative and decreasing as long as the input value u is below the threshold value $u_{min}$. In saturation calculation module 21 of FIG. 4c, a negative gain factor $-a_i$ is applied to achieve a positive saturation value $s_i$ when $u_{min}$ is monitored, whereas, in saturation calculation module 21 of FIG. 4d, a negative gain factor $-a_i$ is applied to achieve a negative saturation value $v_i$ when $u_{max}$ is monitored. The saturation calculation modules 21 of FIG. 4a, b may be useful for most closed-loop controls. However, in specific cases the saturation calculation modules 21 of FIG. 4c, d may be useful. For instance, when a boiler temperature should be reduced as a function of a minimum valve opening degree, the saturation calculation module 21 of FIG. 4c may be useful. It should be noted that the threshold values $u_{min}$ and/or $u_{max}$ may be constant or varying over time for any of the saturation calculation modules 21.

Figure 5C:
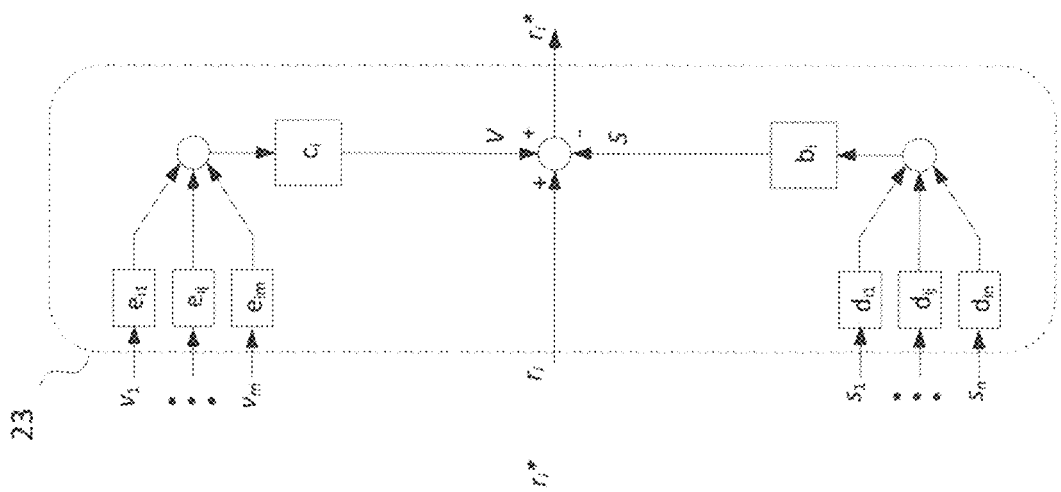
FIGS. 5a-c shows three schematic views with different examples of providing an altered reference value according to the present disclosure.
Figure 5B:
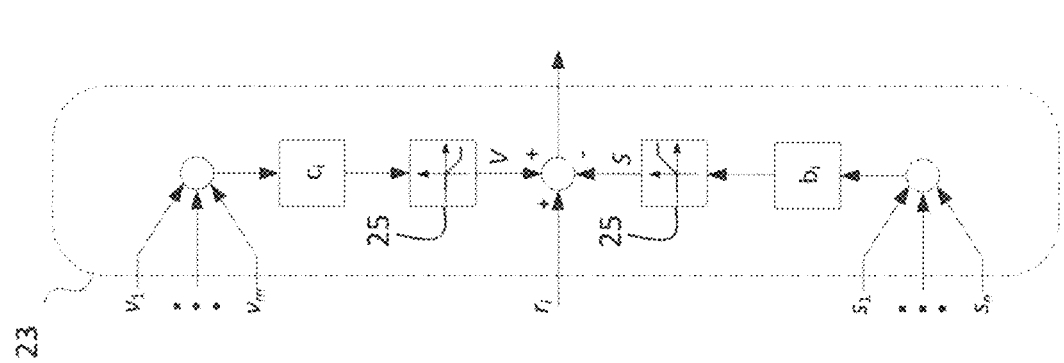
Figure 5A:
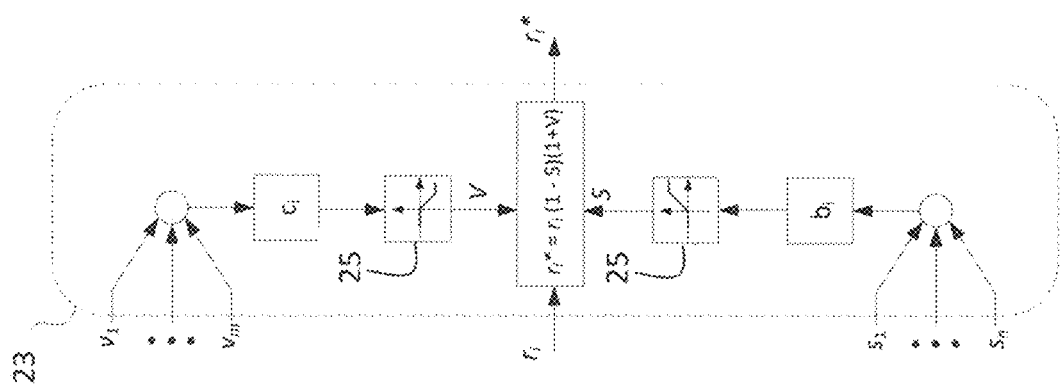

FIGS. 5a-c show three different examples of how a saturation situation is dealt with in a saturation compensation module 23. Any of the saturation compensation modules 23 receive the negative saturation values $v_{1\ldots m}$ and positive saturation values $s_{1\ldots n}$ as input variables from the saturation calculation modules 2 for all consumer branches. The negative saturation values $v_{1\ldots m}$ are accumulated and multiplied by applying a weight factor $c_i$. The positive saturation values $s_{1\ldots n}$ are accumulated and multiplied by applying a weight factor $b_i$. This results in a negative Signal V and positive signal S, which are used to alter a reference value $r_i$. In FIG. 5a, the saturation compensation module 23 alters the reference value $r_i$ to an altered reference value $r_i^*$ by applying the formula $r_i^* = r_i(1-S)(1+V)$. The reference value $r_i$ may for instance be a target temperature or a target pressure differential for the $i^{th}$ consumer branch. In mathematical terms, the operation of the saturation compensation module 23 may read as follows:

$$r_i^* = r_i(1 - S)(1 + V)$$

$$S = \min\left(b_i \sum_{j=1}^{n} s_j, S_{max}\right)$$

$$V = \max\left(c_i \sum_{j=1}^{m} v_j, V_{min}\right)$$

wherein $S_{max}$ and $V_{min}$ are used to set limits on how much the reference value $r_i$ is altered. Depending on what needs to be achieved, applying the alternative formula $r_i^* = r_i(1+S)(1-V)$ may be useful.

FIG. 5b shows a second example of a saturation compensation module 23 that alters the reference value $r_i$ to an altered reference value $r_i^*$ by applying the formula $r_i^* = r_i - S + V$. The reference value $r_i$ may for instance be a target temperature or a target pressure differential for the $i^{th}$ consumer branch. In mathematical terms, the operation of the saturation compensation module 23 may read as follows:

$$r_i^* = r_i - S + V$$

$$S = \min\left(b_i \sum_{j=1}^{n} s_j, S_{max}\right)$$

$$V = \max\left(c_i \sum_{j=1}^{m} v_j, V_{min}\right)$$

wherein $S_{max}$ and $V_{min}$ are used to set limits on how much the reference value $r_i$ is altered. Depending on what needs to be achieved, applying the alternative formula $r_i^* = r_i + S - V$ may be useful.

FIG. 5c shows a third example of a saturation compensation module 23 which applies individual weight factors $d_{ij}$ and $e_{ij}$ for summing up the saturations values $v_{1 \ldots m}$ and $s_{1 \ldots n}$ in order to achieve an optimal balancing in case the design condition of the fluid distribution system is known and parameterised by the pre-determined individual weight factors $d_{ij}$ and $e_{ij}$. In mathematical terms, the operation of the saturation compensation module 23 may read as follows:

$$r_i^* = r_i - S + V$$

$$S = b_i \sum_{j=1}^{n} d_{ij} s_j$$

$$V = c_i \sum_{j=1}^{n} e_{ij} v_j$$

It can be shown that the sum of minimum correction terms $r_i^* - r_i$ to the reference value, i.e.

$$\min_{r^* - r} \sum_{i=1}^{n} \frac{(r_i^* - r_i)^2}{2h_i},$$

is then obtained, wherein $h_i$ is an adjustable parameter indicating the importance that the $i^{th}$ consumer branch must not saturate. It should be noted that a saturation block 25 for applying limits $S_{max}$ and $V_{min}$ as shown in FIG. 5a, b, is not applied in saturation compensation module 23 of FIG. 5c. The saturation block 25 is optional for the saturation compensation module 23.

It should be clear that in case of only positive saturation signals existing in the system by definition, then the generation of the V signal is void. Likewise, in a system that by definition only contains negative saturation signals, the generation of the S signal is void. The reference value $r_i$ may be any reference value for a consumer branch in a fluid distribution system, such as temperature, flow, pressure, thermal or electrical power consumption, electrical motor speed, centrifugal pump speed or the like. Fluid distribution may be related to an HVAC system, a municipal water supply system, to district heating and cooling or a wastewater system.

An advantage of the above shown construction of saturation calculation modules and saturation compensation modules is that the magnitude by which a saturation occurs scales with the timely rate of change of the generated saturation value. Thus, the more severe the saturation is, the faster the compensation reaction is applied.

Figure 6:
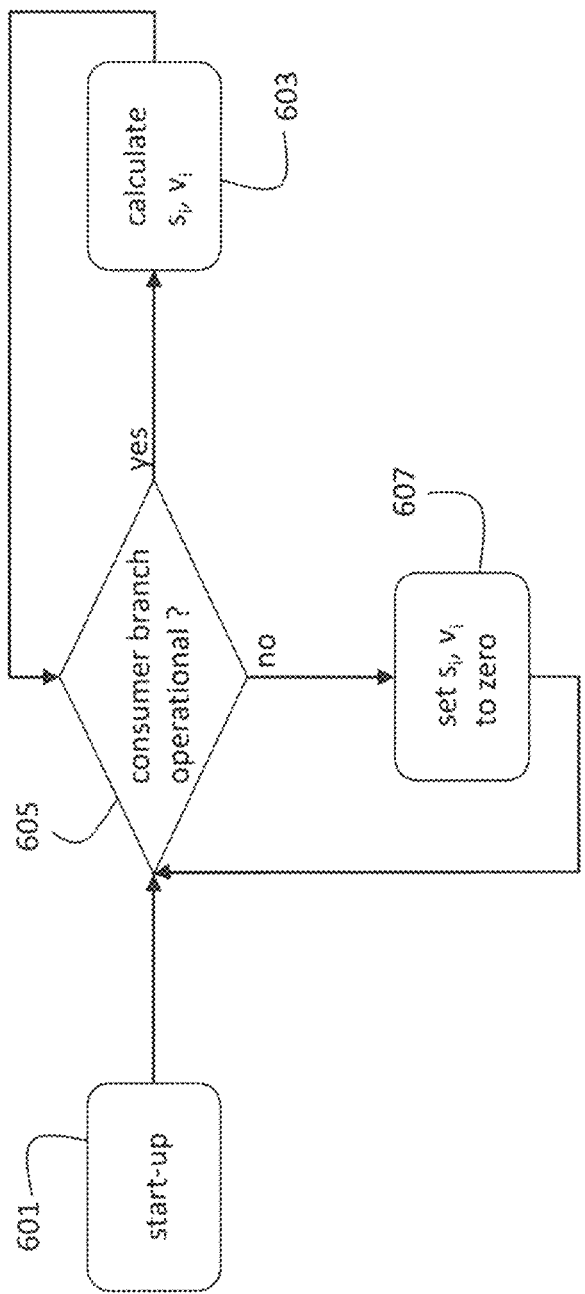
FIG. 6 is a schematic view of an example of determining whether at least one consumer branch is operational according to the present disclosure.

FIG. 6 shows useful method steps to cope with the situation that a certain closed-loop control of a consumer branch is malfunctioning or non-operational. After start-up 601 of the control system, before calculating a saturation signal in step 603, it may be checked in step 605 for at least one of the consumer branches and preferably for all consumer branches whether the closed-loop control is operational. If not, the saturation value of the checked consumer branch is set to zero in step 607, wherein the operational state of that consumer branch may be regularly re-checked. Only if it is deemed to be operational, the saturation signal is calculated in step 603.

Figure 7:
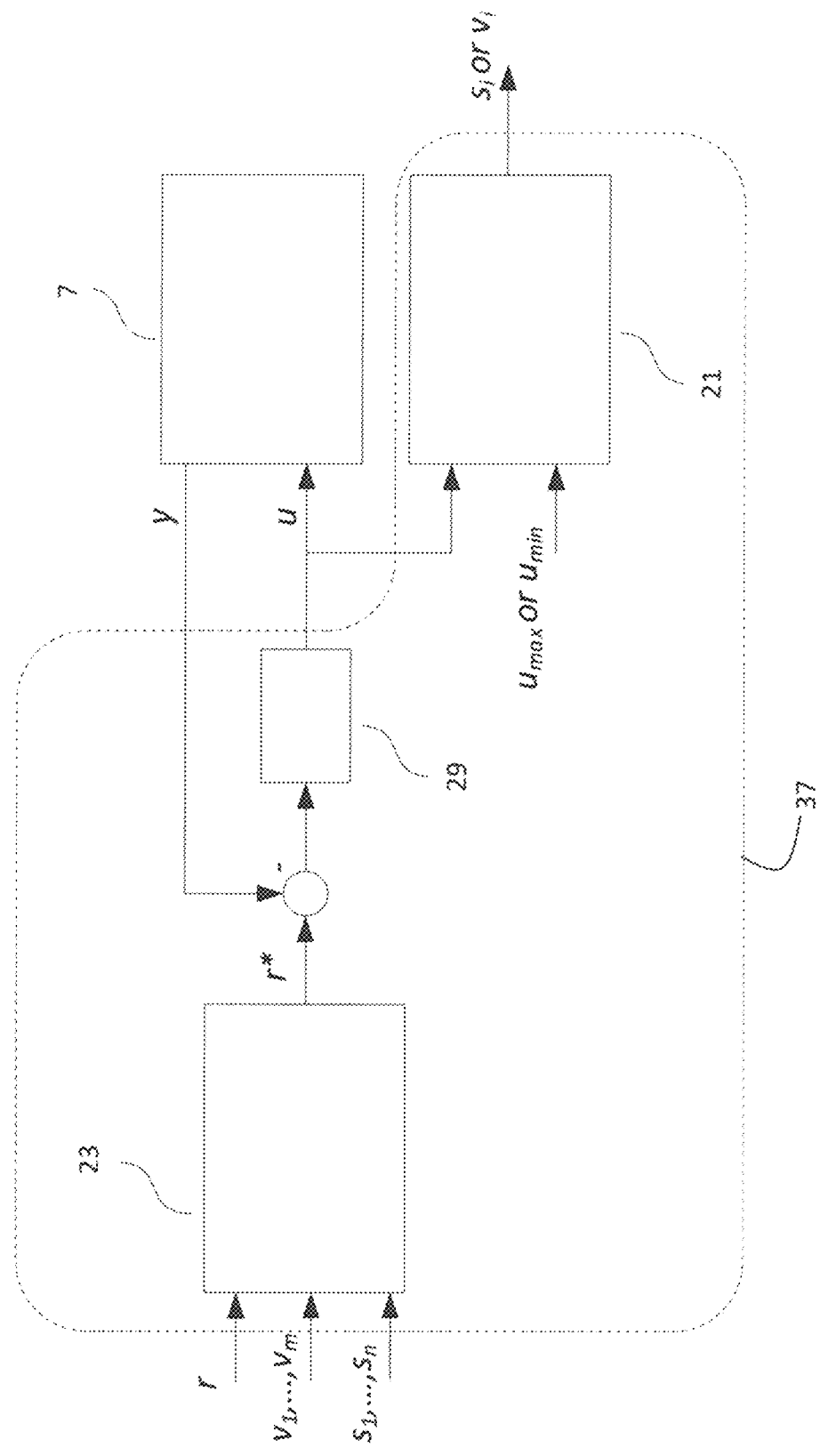
FIG. 7 is a schematic view of an example of a control system according to the present disclosure.

FIG. 7 shows a first example of the control system, wherein the closed-loop control of a consumer branch 7 is performed by a PI controller 29 that may be integrated into the consumer branch control unit 37 or separate from it. The PI controller 29 may, for instance, set the opening-degree of a valve 9 in a consumer branch 7 for regulating a hot water flow through a radiator as a consumer element for consuming thermal power. The measured value y may be a temperature, flow or pressure measured by a sensor 11 in the consumer branch 7. The PI controller 29 compares the measured value y with the altered reference value $r_i^*$ and generates accordingly a control value u as a control command output to the valve 9 in the consumer branch 7. The output of the control value u is not only used to set the valve opening degree, but also as an input into a saturation calculation module 21, which could be of any of the kinds shown in FIGS. 4a-d. The calculated saturation values $s_i$ and/or $v_i$ as output of the saturation calculation module 21 is broadcasted so that a saturation compensation module 23 is able to receive all calculated saturation values $s_{i \ldots n}$ and/or $v_{i \ldots m}$ from each operational consumer branch (with index i) as input. The saturation compensation module 23 alters an initial reference value r based on the saturation values $s_{i \ldots n}$ and/or $v_{i \ldots m}$ from all consumer branches as shown in FIG. 5a-c. The altered reference value $r_i^*$ is then used as input to the PI controller 29 for controlling the valve 9.

For example, in case of a cooling system, the reference value may be a target temperature T to be achieved in all consumer branches. There are no negative saturation values $v_{i \ldots m}$ in this example. The saturation calculation module 21 of one consumer branch i calculates a positive saturation value $s_i$ that indicates a certain degree of saturation in that consumer branch i. This may be the case, for example, if the opening-degree of a valve 9 in that consumer branch i is above the maximum threshold value, e.g. 90%, for a certain period of time. The saturation compensation module 23 receives the saturation values $s_{i\ldots n}$ from all consumer branches i-n, wherein only the saturation value $s_i$ is non-zero. The reference value r is then altered for all consumer branches i-n, i.e. the new target temperature T* is set somewhat higher for the cooling system. This causes the PI controllers of all non-saturated consumer branches j-n to close their valves slightly, because less cooling power is needed to achieve the higher new target temperature T*. In addition, consumer branch i may also contribute to prevent starvation of all or some of the consumer branches by not fully opening its valve. There is now more thermal energy flow available for the starved consumer branch i, which now gets a higher fraction of the thermal energy flow in order to mitigate the saturation situation for the consumer branch i. The end of the saturation situation is indicated by the saturation value $s_i$ decreasing to zero as the opening-degree of the valve 9 is again below the maximum threshold value, e.g. 90%, for a certain period of time. The control system thereby dynamically reacts to saturation situations already occurring or starting to occur as quickly as needed depending on the severity of the saturation.

Figure 8:
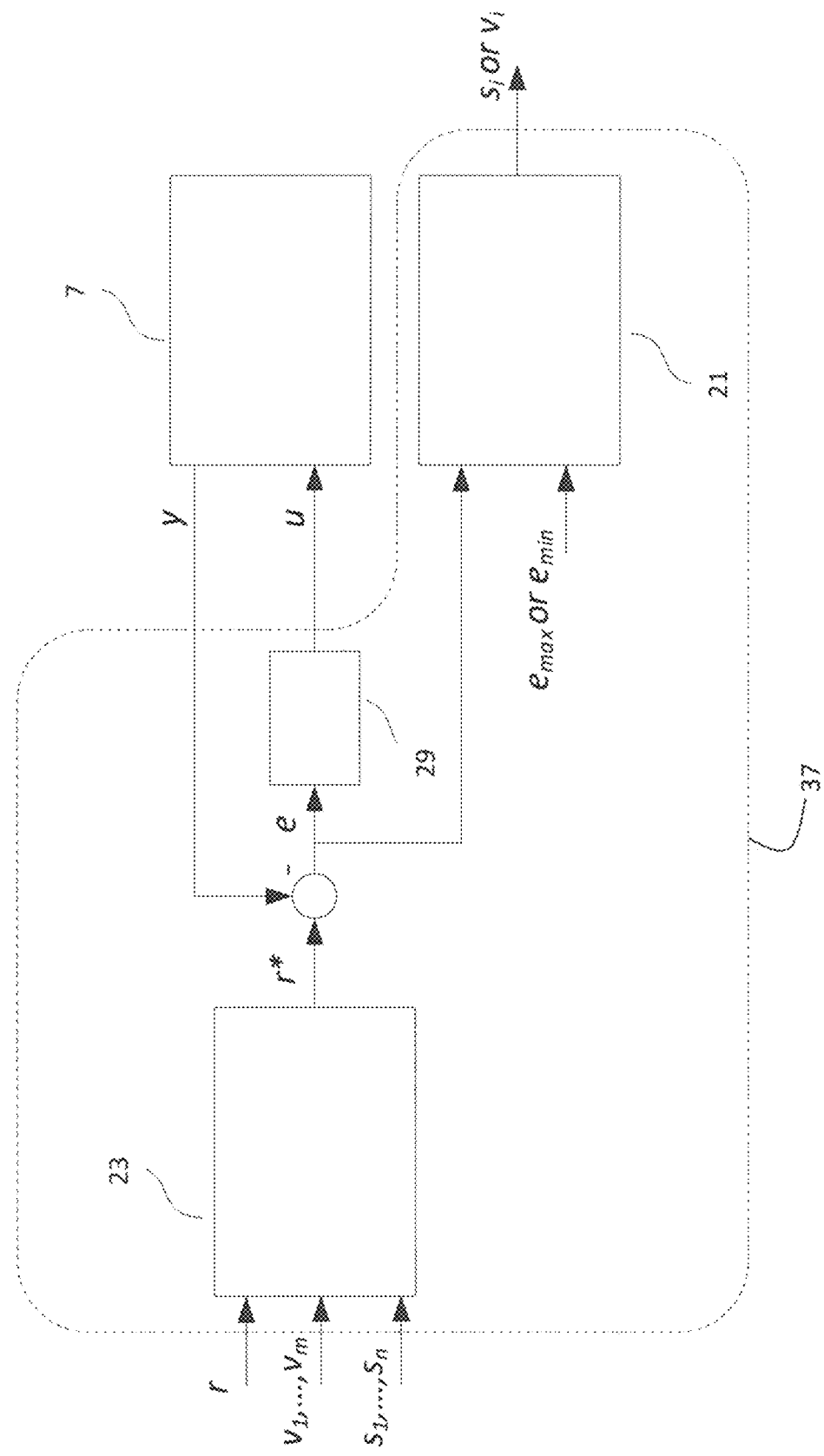
FIG. 8 is a schematic view of another example of a control system according to the present disclosure.

FIG. 8 is almost identical to FIG. 7, but here it is not the control value u that is used as an input variable to the saturation calculation module 21, but it is the error value e, wherein e is the deviation of the measured value y from the altered reference value r*. Thus, the saturation value for one or more operational consumer branches may be based on the measured value y and/or the control value u. In the example of FIG. 8, the error value e=r*−y is used as input into one of the saturation calculation options according to FIGS. 4a-d, i.e. the deviation of the error value e from a threshold value $e_{min}$ or $e_{max}$ is, with a gain factor $a_i$ applied, added up to yield the saturation value $s_i$, $v_i$.

FIGS. 9a-h show different kinds of consumer branches 7 with different closed-loop controlled regulation devices 9 and different consumer elements 31. FIG. 9a shows a valve 9 as regulation device in a feed line 17 of the consumer branch 7, wherein the valve 9 is controlled by receiving a control value u from a PI controller (not shown in FIGS. 9a-h). A differential pressure sensor 11 measures the differential pressure dp between the feed line 17 and a return line 15 of the consumer branch 7. The measured value y of the differential pressure dp is fed back to the PI controller. The reference value r for this consumer branch 7 may be a target differential pressure. In FIG. 9b, the consumer branch 7 is thermally connected to the feeder branch by a heat exchanger 19. A valve 9 regulates the thermal energy flow into the feed line 17 of the consumer branch 7, wherein the valve 9 is controlled by receiving a control value u from a PI controller. A temperature sensor 11 is located in the feed line 17 downstream of the heat exchanger 19. A feed line pump 33 circulates fluid through the consumer branch 7. The measured value y of the feed temperature T is fed back to the PI controller for controlling the valve 9. The consumer branch 7 in FIG. 9c comprises a bypass 12 fluidly connecting the return line 15 with the fee line 17. A three-way valve 9 is used as a closed-loop controlled regulating device, where the bypass 12 connects with the feed line 17. A temperature sensor 11 is located in the feed line 17 downstream of the bypass 12. The measured value y of the feed temperature T is fed back to the PI controller for controlling the valve 9. FIG. 9d shows an uncontrolled bypass 12 between the feed line 17 and the return line 15. As in FIG. 9a, the valve 9 simply regulates the thermal energy flow from the feeder branch 2 (see FIG. 1) into the feed line 17 of the consumer branch 7. A feed line pump 33 circulates fluid through the consumer branch 7, i.e. the return flow through the bypass 12 and the thermal energy input from the feeder branch 2 through valve 9. As in FIG. 9c, a temperature sensor 11 is located in the feed line 17 downstream of the bypass 12. FIG. 9e shows a consumer element 31 in form of a cooling coil with a fan 35 for providing a cooling air stream, whereas FIGS. 9f,g each show a consumer element 31 in form of a heating coil with a fan 35 for providing a heating air stream. A temperature sensor 11 measures the temperature as the measured variable y for the PI controller feedback. In the consumer branch 7 of FIG. 9e, the PI controller controls the speed and/or power of a feed line pump 9 as the regulating device. In the consumer branch 7 of FIG. 9f, the PI controller controls the opening-degree of a valve 9 in the feed line 17 as the regulating device. The consumer branch 7 shown in FIG. 9g has in addition a bypass 12 and a feed line pump 33. The consumer branch 7 as shown in FIG. 9h is not part of a fluid distribution system for transport of thermal energy, but a pressure zone of a municipal water supply network. The consumer elements 31 are households that consume supplied water as such. A zone pressure sensor 11 measures the water pressure in the pressure zone and gives it as a feedback value y to the PI controller controlling a pressure reducing valve 9 in a closed-loop manner by setting a control value u. The reference value r is here a target zone pressure.

Figure 10:
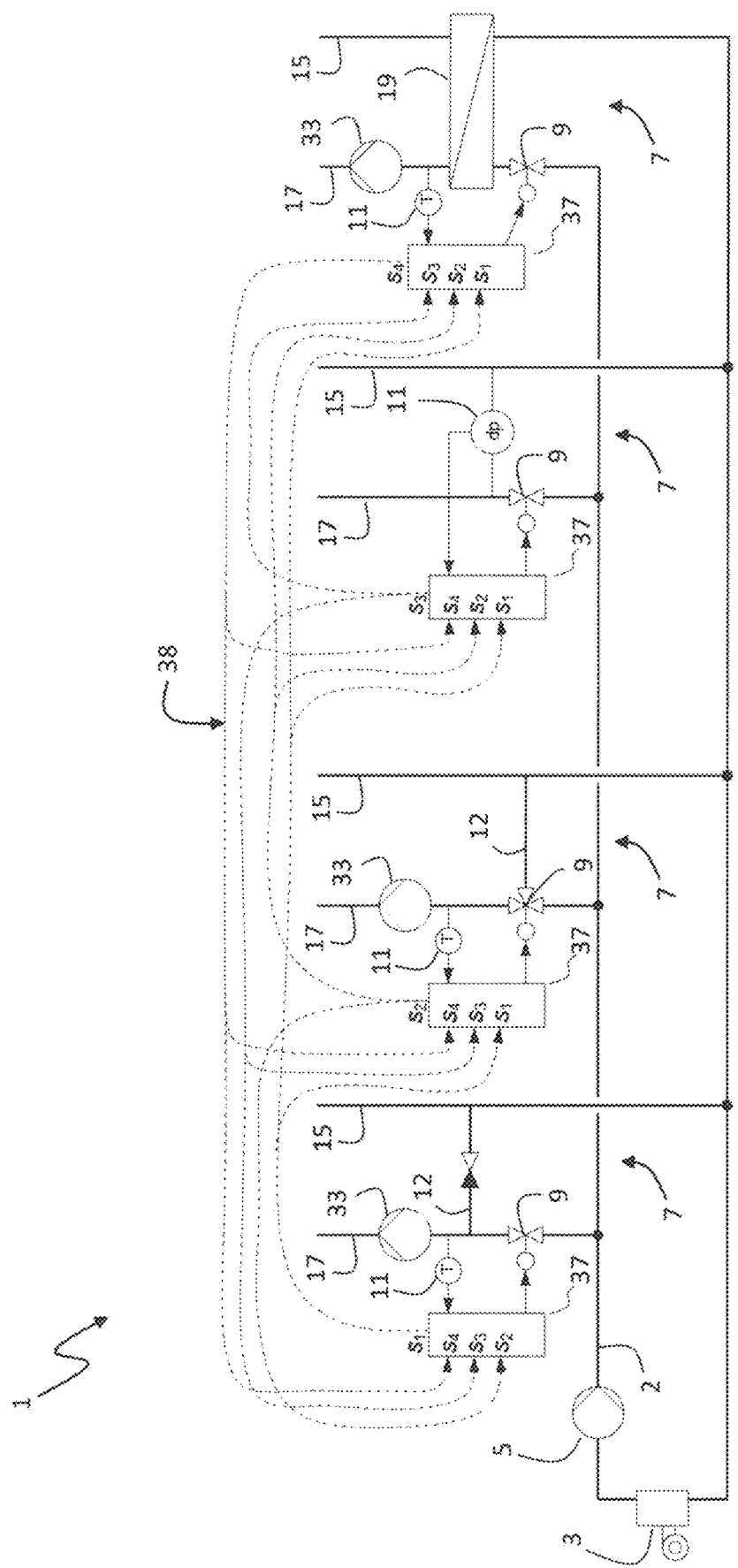
FIG. 10 is a schematic view of an example of a fluid distribution system with a control system according to the present disclosure.

FIG. 10 shows a fluid distribution system in form of an HVAC system. Similar to FIG. 1, the system 1 comprises four different consumer branches 7 connected in parallel to a common feeder branch 2. However, in contrast to FIG. 1, each consumer branches 7 is controlled by a consumer branch control unit 37. The consumer branch control units 37 have a bi-directional communication to each other so that each control units 37 can send and receive signals to any of the other control units 37, preferably by sending and receiving broadcast signals in a wired or wireless network 38. The consumer branch control units 37 comprise both a saturation calculation module 21 and a saturation compensation module 23. Each consumer branch control unit 37 sends its determined saturation value $S_i$ to the other consumer branch control units 37 and receives the respective saturation value $S_i$ of each of the other consumer branch control units 37. The consumer branch control units 37 may be implemented into internal pump or valve control electronics or into internal sensor electronics. This means that the saturation calculation modules 21 and the saturation compensation modules 23 may be added as additional functionalities in form of software to be executed on existing hardware within an electronics housing of a pump assembly and/or a sensor housing. Alternatively, or in addition, the hardware of the PI controller for the closed-loop control of the regulating device may be augmented by the functionality of the saturation calculation modules 21 and/or the saturation compensation modules 23 in form of a software update.

Figure 11:
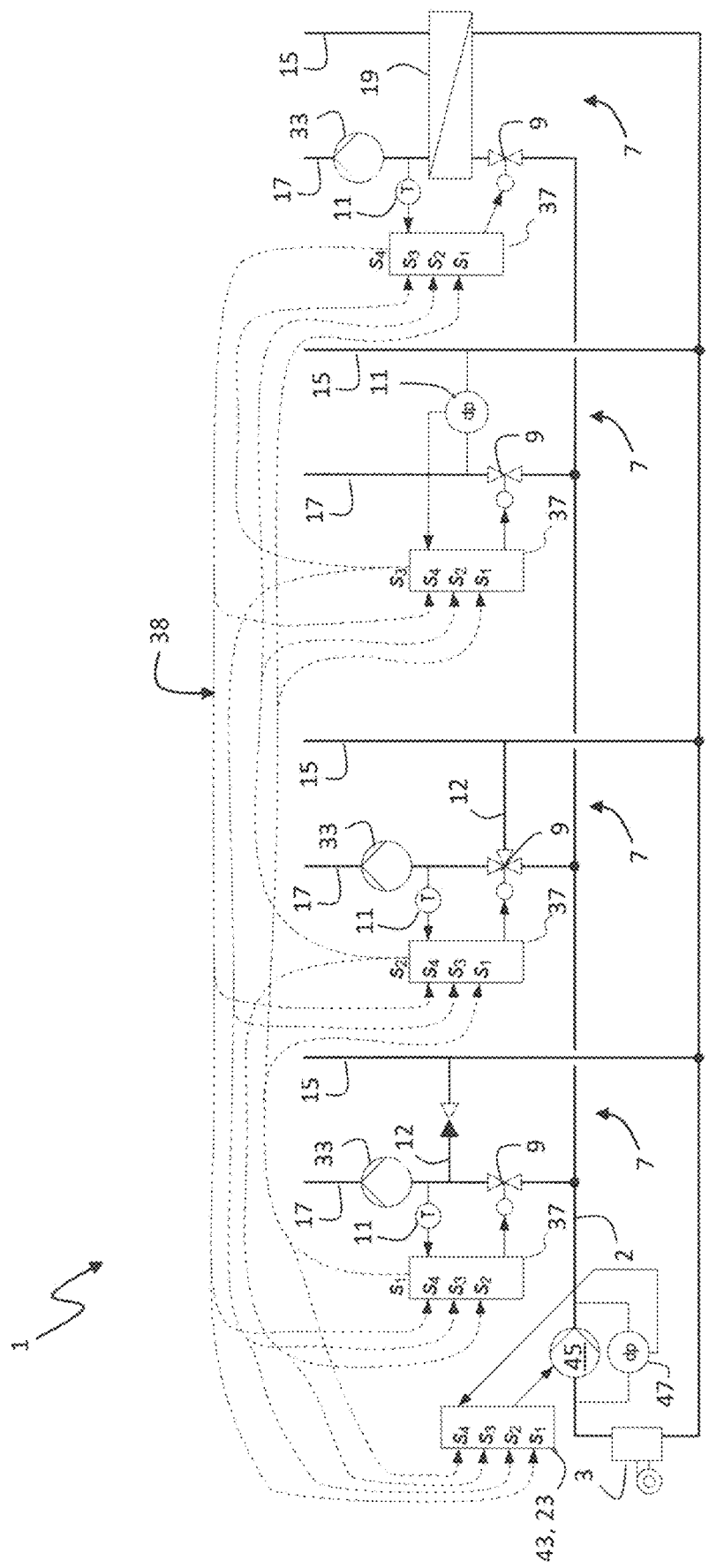
FIG. 11 is a schematic view of another example of a fluid distribution system with a control system according to the present disclosure.

The fluid distribution system 1 shown in FIG. 11 differs from the one shown in FIG. 10 by the saturation compensation module 23 being implemented in a feeder branch control unit 43. In this example, the consumer branch control units 37 only comprise the saturation calculation module 21 and no saturation compensation module 23. A feeder branch 2 of the fluid distribution system 1 comprises a feeder branch regulating device 45 in form of a feeder pump for regulating the total flow of fluid and/or thermal energy through the feeder branch 2. A feeder pump pressure sensor 47 measures the feeder pump pressure as a feedback value for a closed-loop control of the feeder pump 45. The saturation compensation module is implemented in the feeder branch control unit 43 at the feeder branch 2, wherein the feeder branch control unit 43 is configured to receive the saturation values $S_{1-4}$ from consumer branch control units 37 at each operational consumer branch 7, so that the feeder pump 45 is closed-loop controllable based on a comparison between the altered reference value r* and the feeder pump pressure measured by a sensor 47 in the feeder branch 2. The feeder branch control unit 43 may be implemented into the internal pump control electronics of the feeder pump 45 and/or into an external controller thereof.

Figure 12:
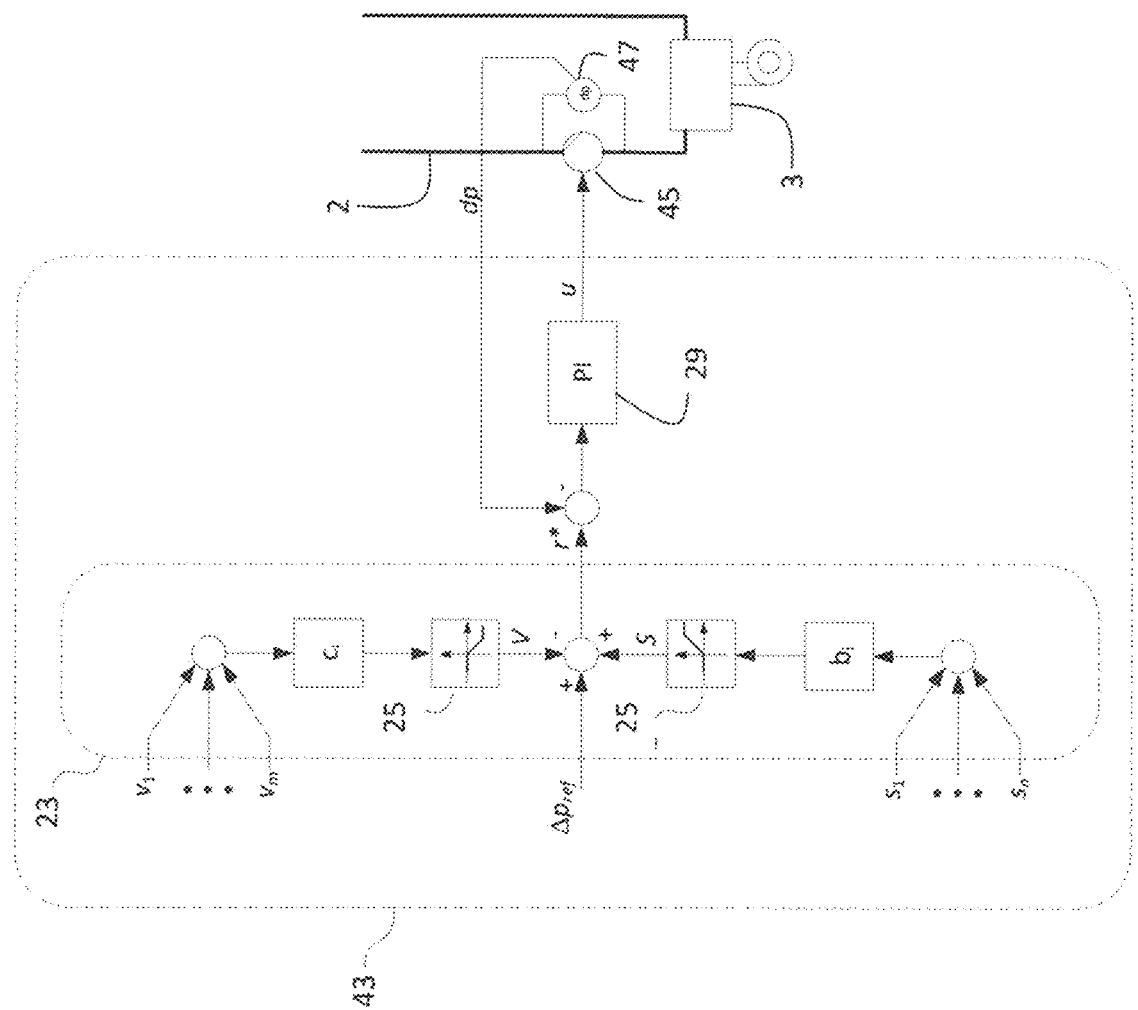
FIG. 12 is a schematic view of an example of a saturation compensation module implemented in a pump pressure controller according to the present disclosure.
Figure 13:
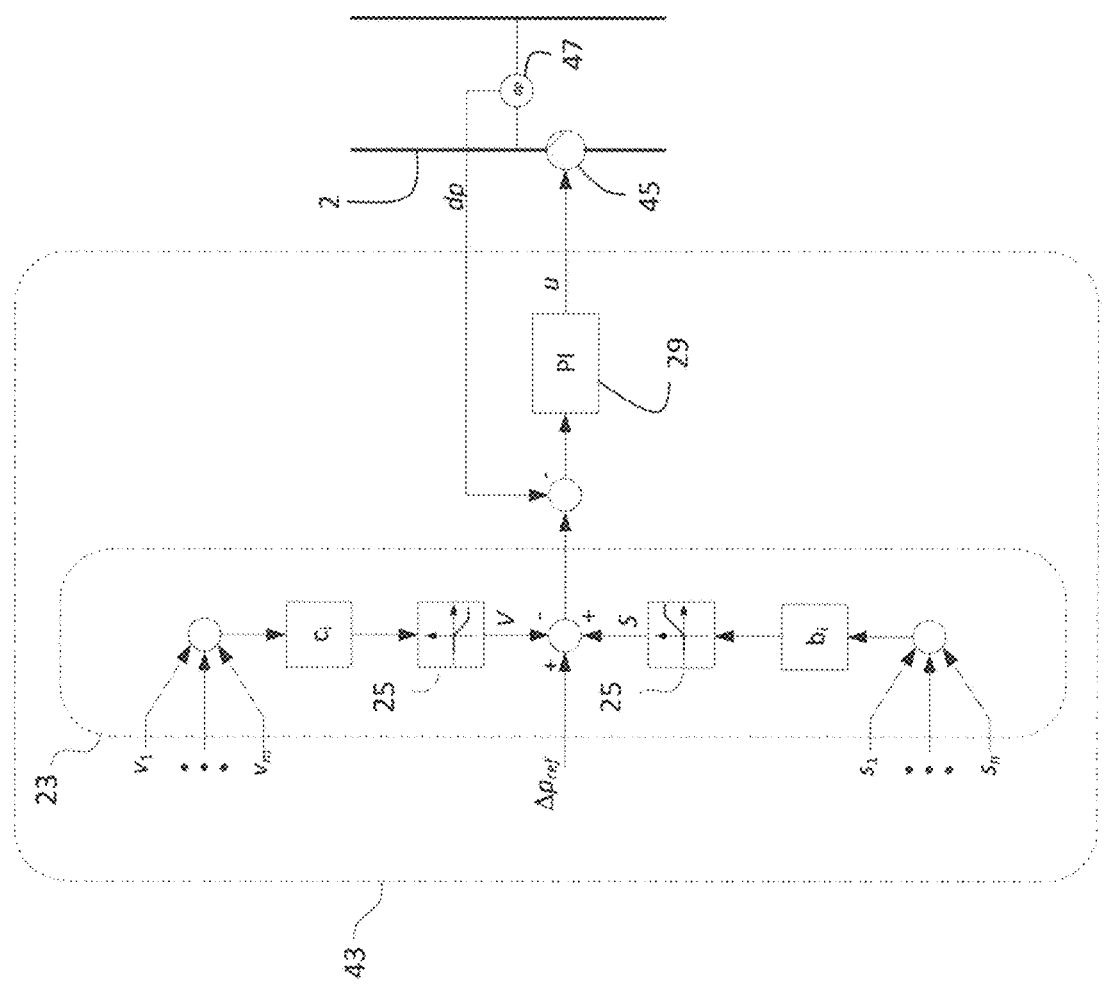
FIG. 13 is a schematic view of an example of a saturation compensation module implemented in a differential pressure controller according to the present disclosure.

So, in case of a saturation of a consumer branch 7 in the system of FIG. 11, the feeder branch control unit 43 may alter the reference feeder pump pressure $\Delta p_{ref}$ to a higher reference value r*, which leads to an increase of the speed and/or power of the feeder pump 45. Obviously, the range of compensation is limited by how much the speed and/or power of the feeder pump 45 can be increased to mitigate the saturation situation. FIG. 12 shows schematically how the saturation compensation works here, wherein the negative saturation signals $v_{i \ldots m}$ are zero in this example. The saturation compensation in FIG. 13 is similar, but the differential pressure between a feed line and a return line of the feeder branch 2 is measured by the sensor 47 instead of the feeder pump pressure.

Figure 14:
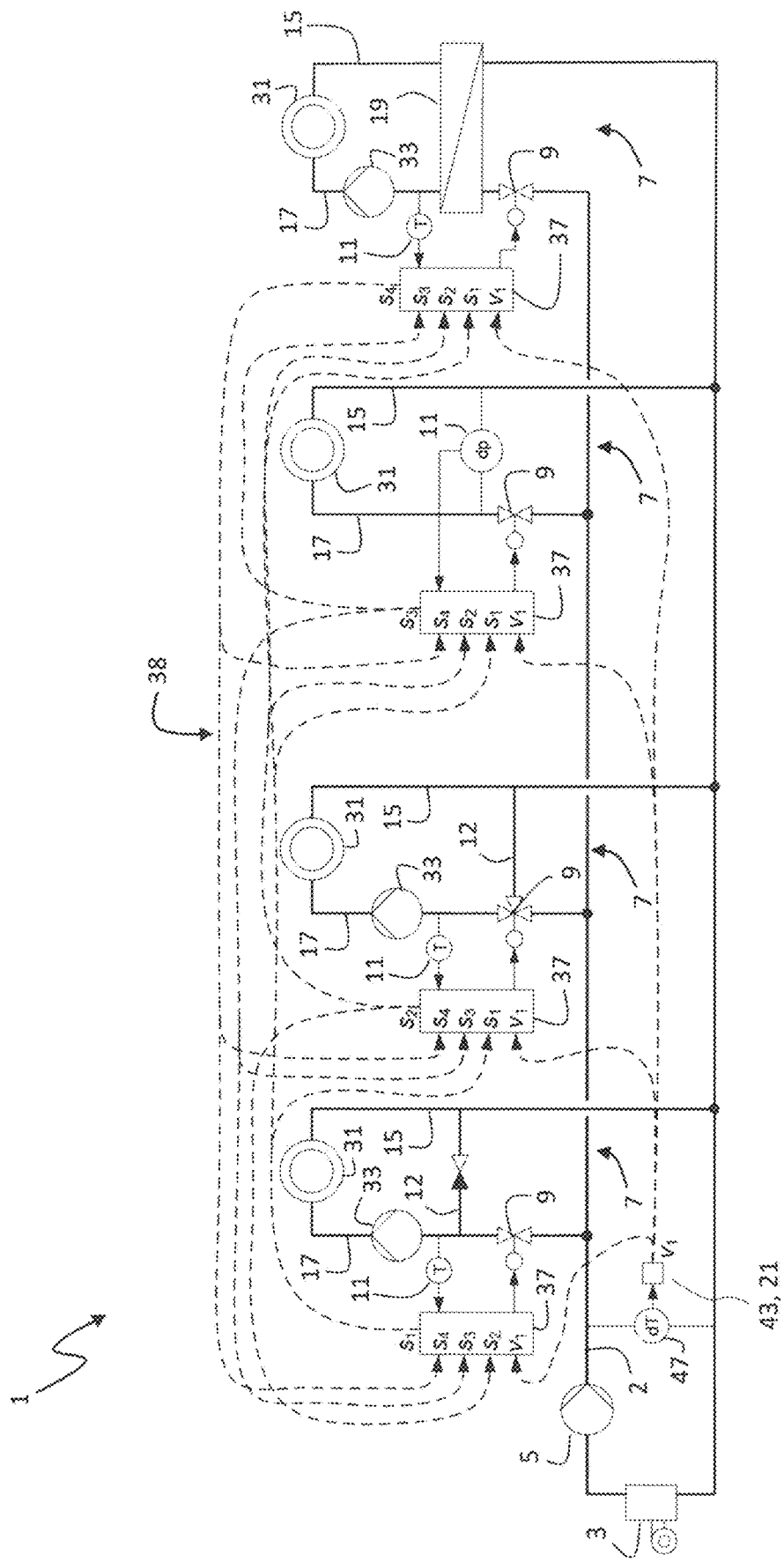
FIG. 14 is a schematic view of an example of an HVAC system as a fluid distribution system with a control system according to the present disclosure.

FIG. 14 shows a similar system as shown in FIG. 10 with consumer branch control units 37 comprising both the saturation calculation module 21 and the saturation compensation module 23 for each consumer branch 7. However, in addition, there is a feeder branch control unit 43 with an implemented saturation calculation module 21 that receives a differential feeder temperature from a feeder branch temperature sensor 51 arranged to measure the difference between the feed temperature and the return temperature in the feeder branch 2. The feeder branch control unit 43 calculates a negative saturation signal $v_1$ according to FIG. 4b when the differential feeder temperature falls below a pre-determined minimum. The negative saturation signal $v_1$ is broadcasted to all consumer branch control units 37 like all the other positive saturation signals $s_{1 \ldots 4}$ and processed in the saturation compensation modules as shown in FIG. 5.

Figure 15:
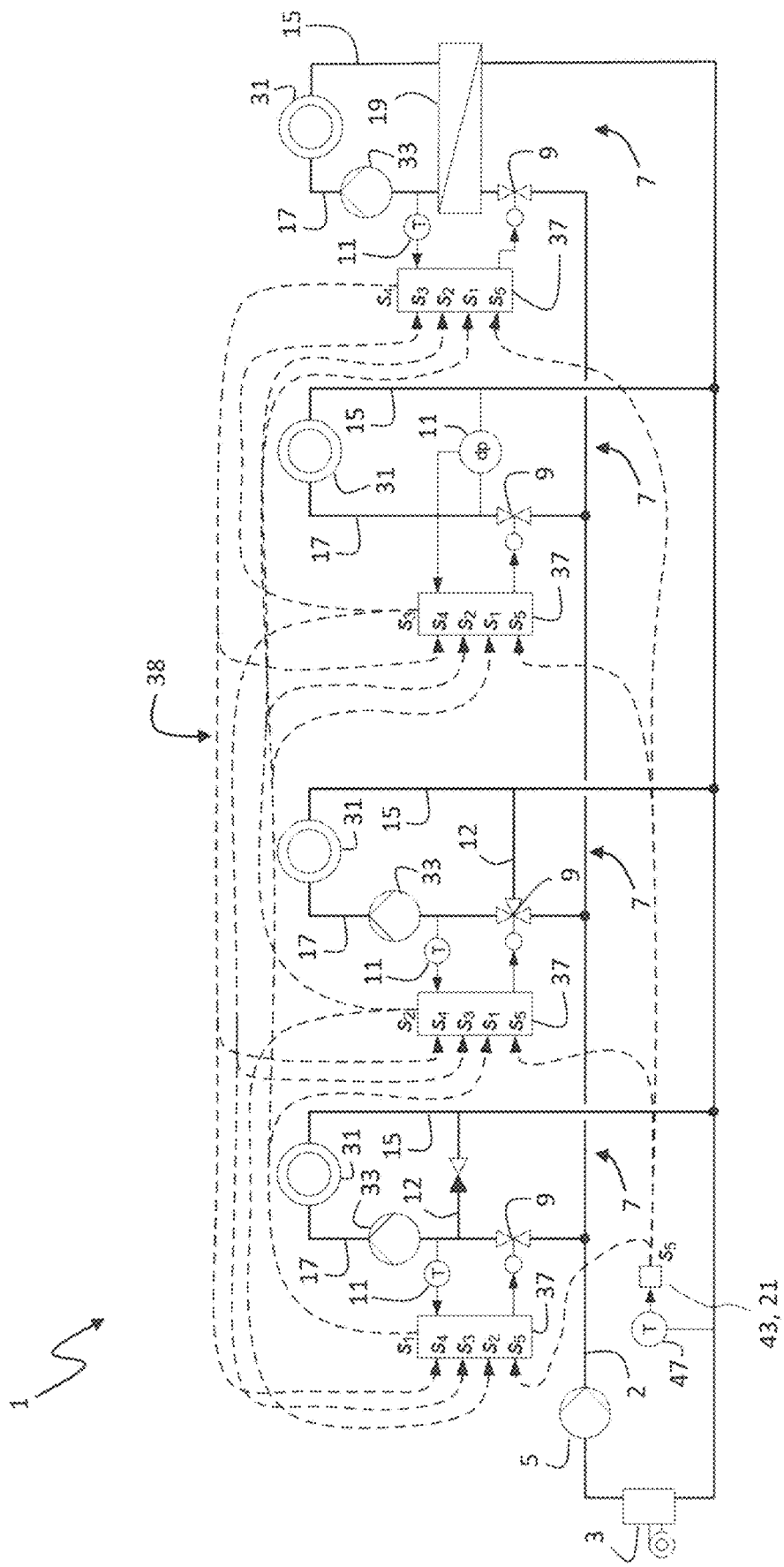
FIG. 15 is a schematic view of an example of another HVAC system as a fluid distribution system with a control system according to the present disclosure.

The system shown in FIG. 15 differs from FIG. 14 in that the feeder branch temperature sensor 51 measures the absolute return temperature in the feeder branch 2. The feeder branch control unit 43 calculates a positive saturation signal $s_1$ according to FIG. 4a when the absolute return temperature rises above a pre-determined maximum. The positive saturation signal $s_1$ is broadcasted to all consumer branch control units 37 like all the other positive saturation signals $s_{1 \ldots 4}$ and processed in the saturation compensation modules as shown in FIGS. 5a-c.

Figure 16:
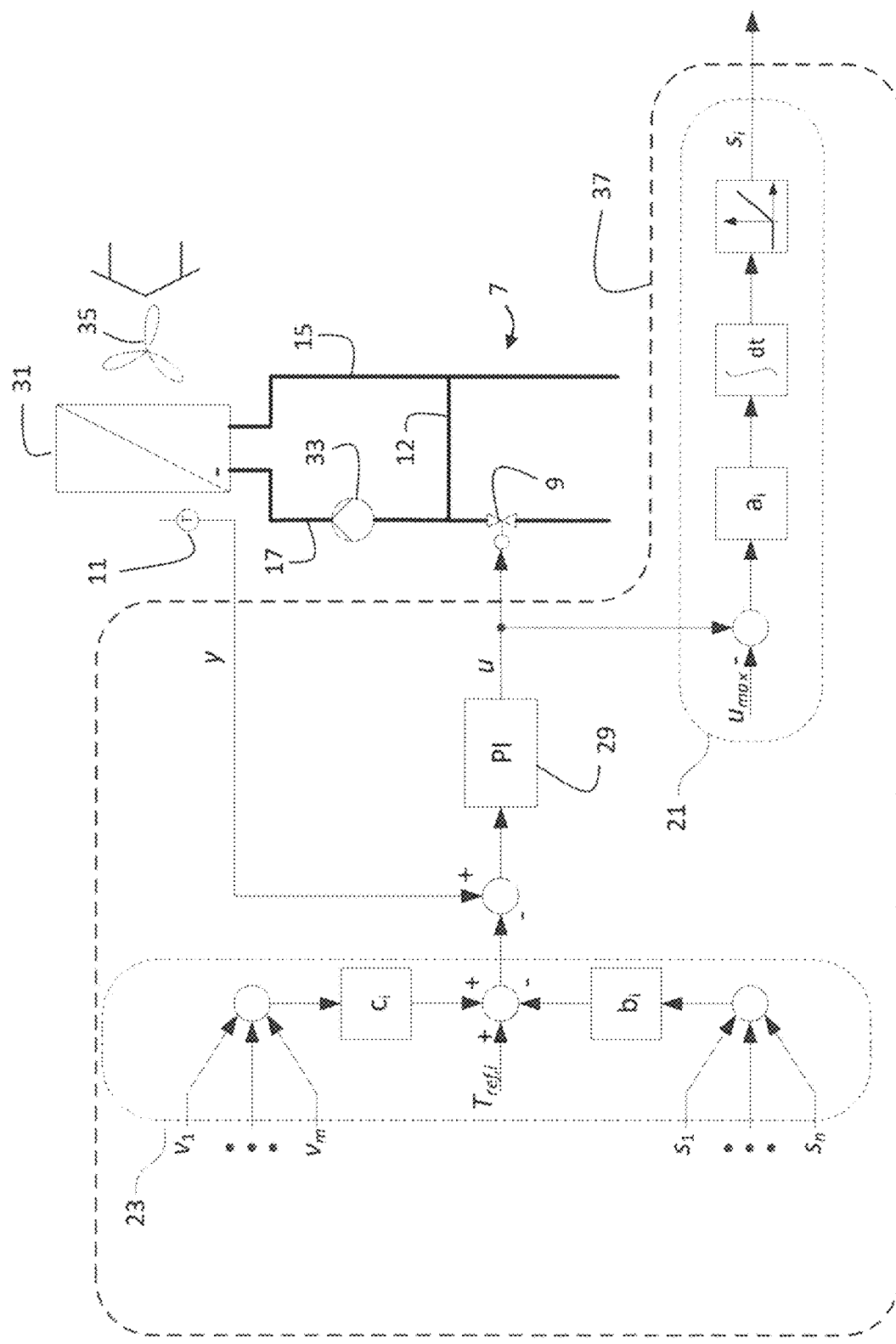
FIG. 16 is a schematic view of an example of a saturation compensation module and a saturation calculation module implemented in an air condition controller according to the present disclosure.

FIG. 16 shows schematically how the control system may be applied as an overload protection of a chilled water coil as a consumer element 31. The saturation calculation according to FIG. 4a may be used to provide a positive saturation signal $s_i$. A saturation compensation according to FIG. 5c may be used to alter the reference value r to r*. Most likely, assuming the $i^{th}$ consumer branch 7 is not saturated, the altered reference value r* will be lower than the initial reference value r, so that −r* is applied as input to the PI controller 29 in case of a saturation situation in another consumer branch 7, so that less thermal energy flow is to be attributed to the chilled water coil 31 in the $i^{th}$ consumer branch 7. Thereby, the PI controller will send a control value u to the valve 9 for closing somewhat. Thus, there will be more thermal energy flow available for the starved consumer branch 7, which will mitigate or end the saturation situation.

Figure 17:
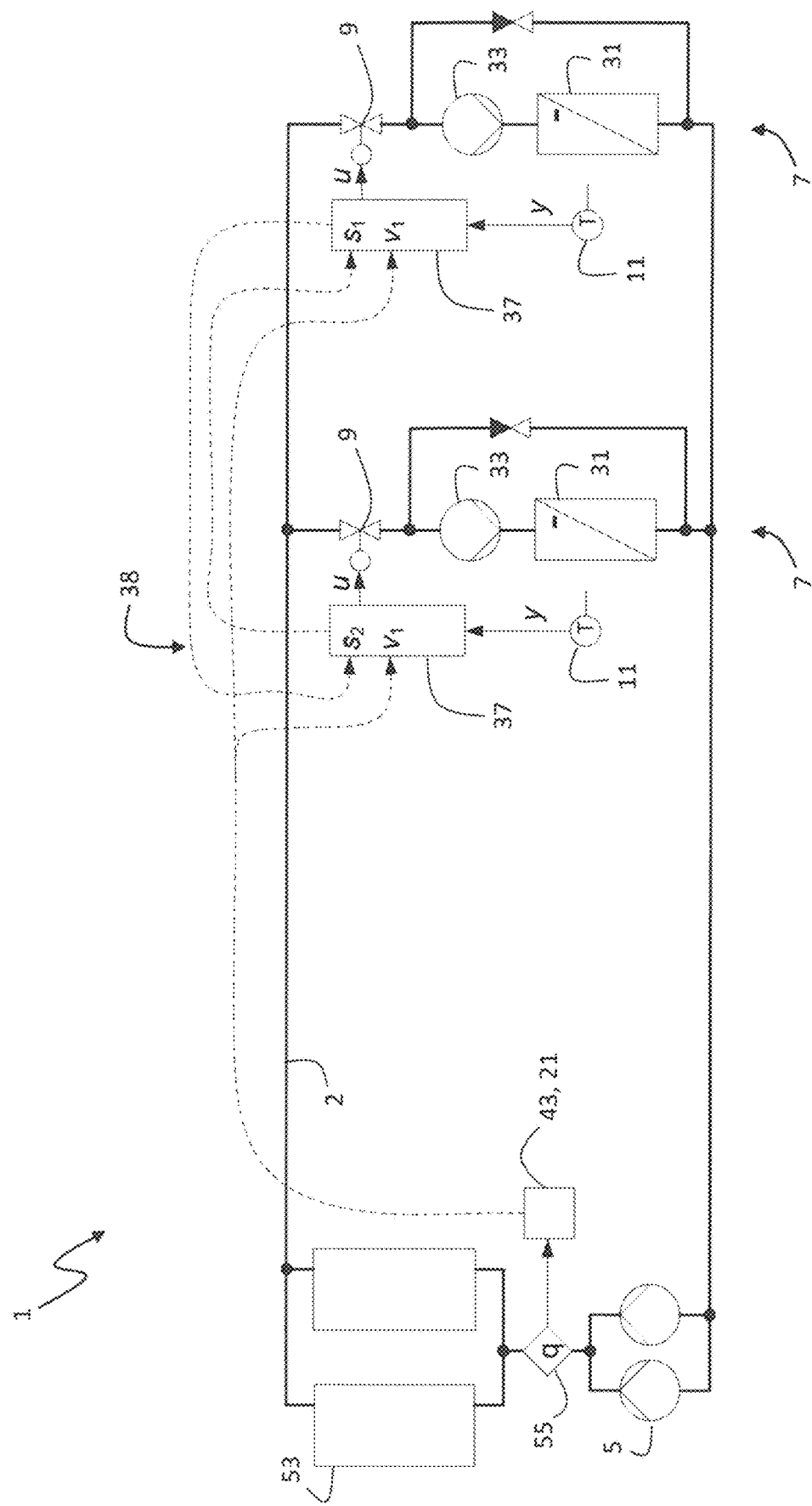
FIG. 17 is a schematic view of an example of a chiller system without bypass as a fluid distribution system with a control system according to the present disclosure.
Figure 18:
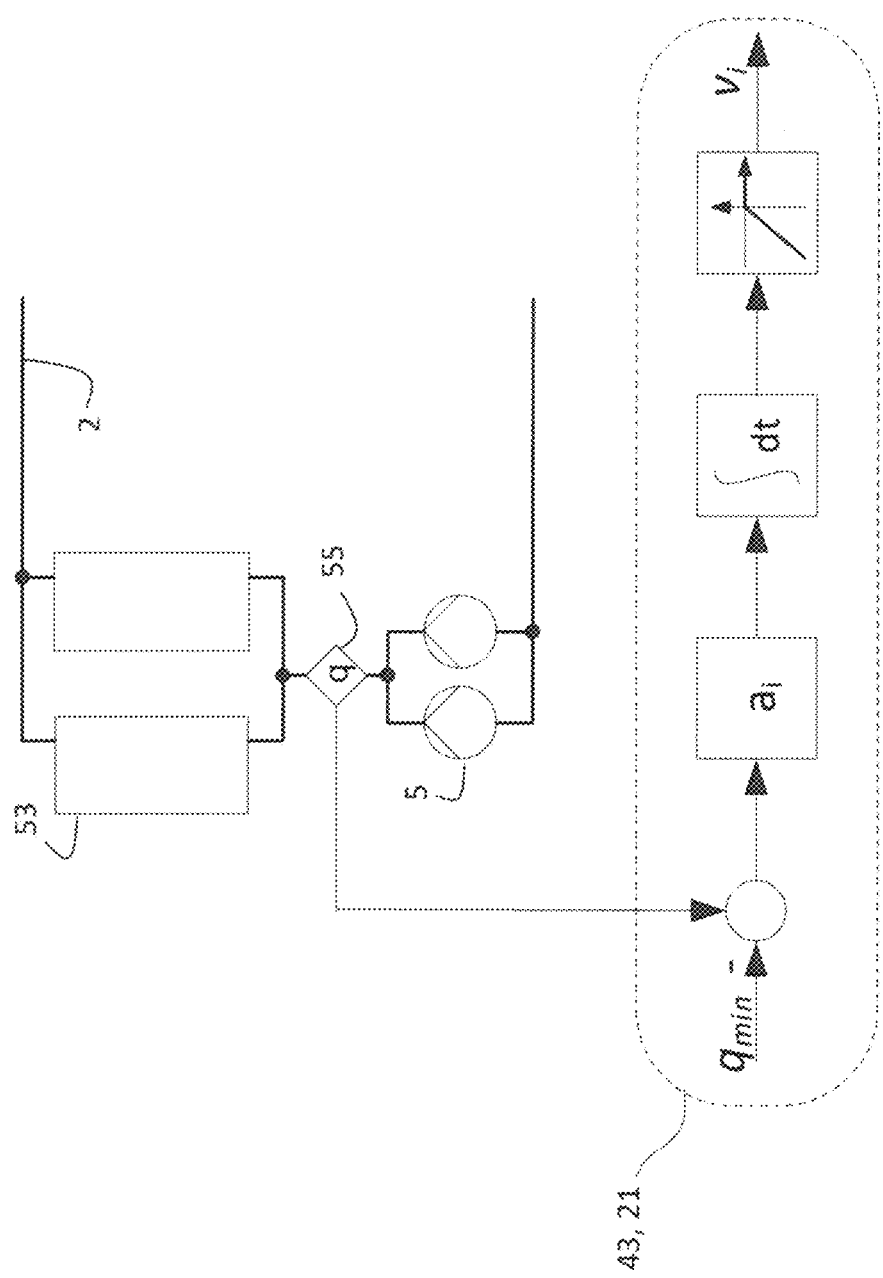
FIG. 18 is a schematic view of an example of a saturation calculation module implemented in a chiller controller according to the present disclosure.

FIG. 17 shows a cooling system with both overload protection of chilled water coils 31 in consumer branches 7 as well as an underload protection for a chiller 53 which acts together with feeder pumps 5 as a source element 3 (see FIGS. 1-3) for providing a thermal energy flow in the feeder branch 2. The chiller 53 typically requires a minimum flow for preventing damage. Therefore, a feeder branch control unit 43 with a saturation calculation module 21 according to FIG. 4b calculates a negative saturation value $v_1$ if the flow measured by a feeder branch flow meter 55 falls below a pre-determined minimum $q_{min}$ (see FIG. 18). As described before, the consumer branch control units 37 at the consumer branches 7 receive the negative saturation value $v_1$ and the positive saturation value $s_1$ from the other consumer branch 7 for altering the reference value as input of the PI controller 29 of the consumer branch control units 37 controlling the valves 9 accordingly.

Figure 19:
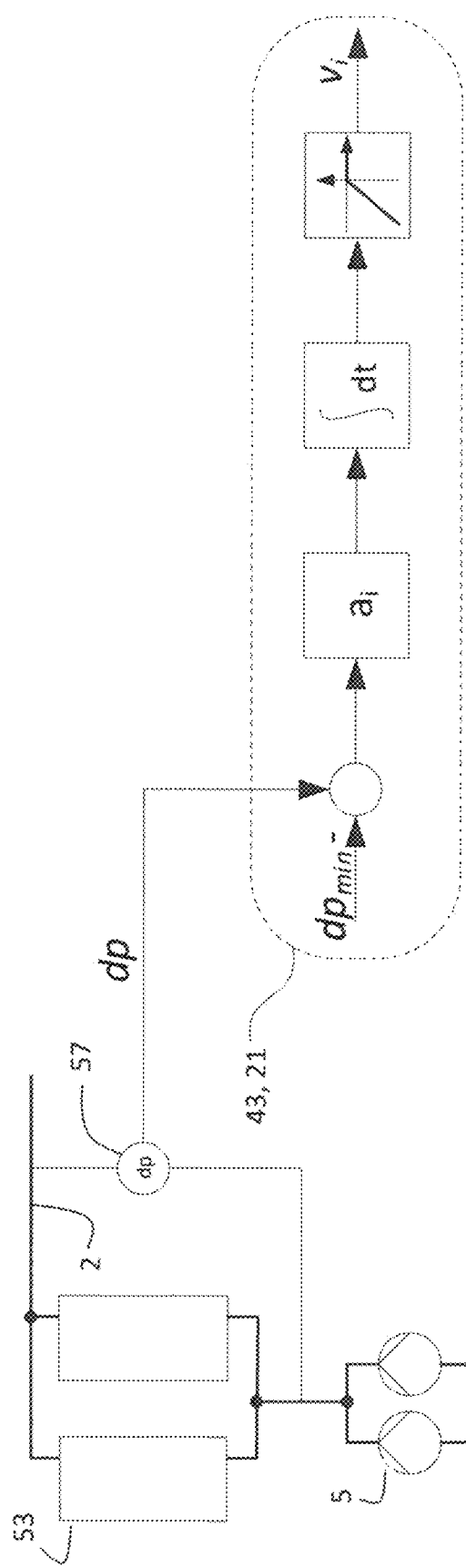
FIG. 19 is a schematic view of another example of a saturation calculation module implemented in a chiller controller according to the present disclosure.

Instead of using a feeder branch flow meter 55, a feeder branch differential pressure sensor 57 may be used as shown in FIG. 19 for monitoring a minimum pressure differential across the chiller 53. Accordingly, the feeder branch control unit 43 calculates negative saturation value $v_1$ if the differential pressure dp across the chiller 53 measured by the feeder branch differential pressure sensor 57 falls below a pre-determined minimum $dp_{min}$ according to FIG. 4b.

Figure 20:
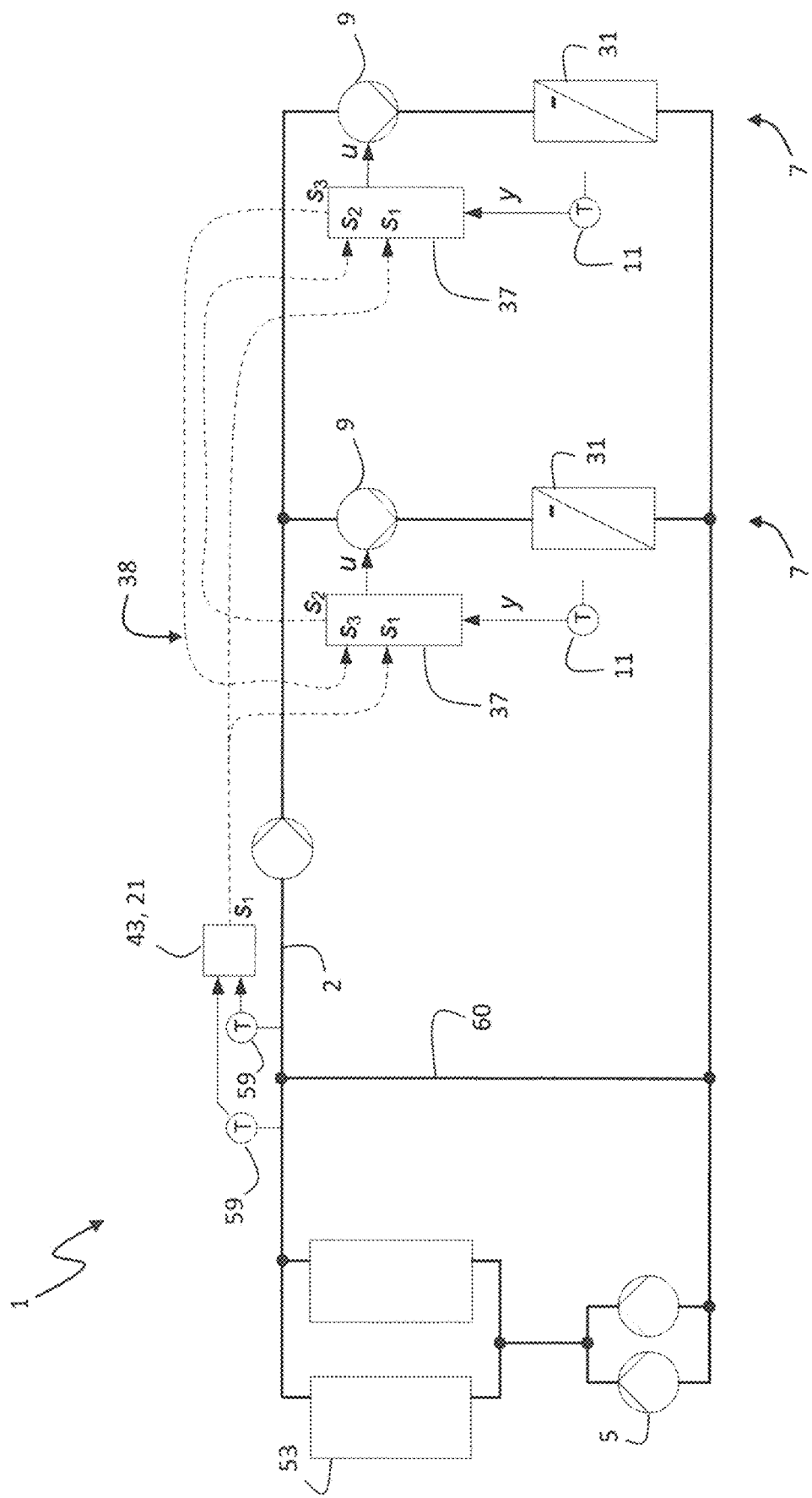
FIG. 20 is a schematic view of a cooling system with bypass as a fluid distribution system with a control system according to the present disclosure.
Figure 21:
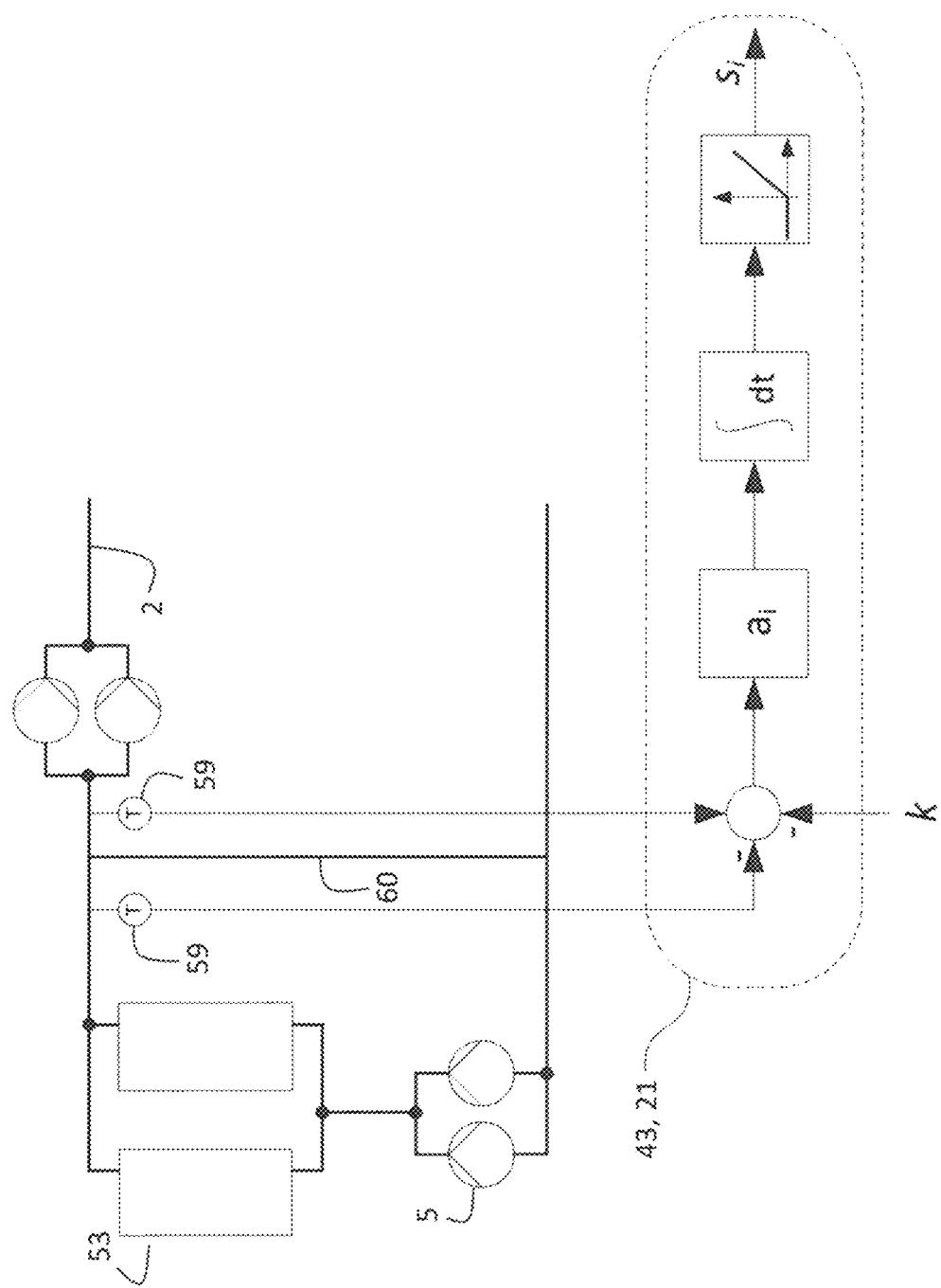
FIG. 21 is a schematic view of another example of a saturation calculation module implemented in a chiller controller according to the present disclosure.

Yet another example is given in FIG. 20 for reacting to a temperature collapse, wherein the feed temperature in the feeder branch 2 is measured by one temperature sensor 59 arranged upstream of a feeder bypass 60 and another temperature sensor 59 downstream of the bypass 12. If the difference between the two measurements is too high, an undesirable flow through the feeder bypass 60 is indicated. In contrast to the examples of saturation calculations shown in FIG. 4a-d, the saturation calculation module 21 of the feeder branch control unit 43 here uses another way to calculate the positive saturation value $s_1$ (see FIG. 21). The feeder branch control unit 43 here takes the two temperature measurements as time-variable inputs and calculates the temperature difference. A small positive offset k is applied to make sure that the output of the sum may be negative when the temperature difference is zero in order to allow the saturation value to decrease to zero in a stable non-saturation situation. In case a maximum temperature difference is exceeded for a certain period of time, the positive saturation value $s_1$ is broadcasted to the consumer branch control units 37 at the consumer branches 7. The reference temperature $T_{ref, i}$ will be increased to r*, so that the speed and/or power of the pumps 9 is reduced by the respective PI controllers 29 within the consumer branch control units 37.

Figure 22:
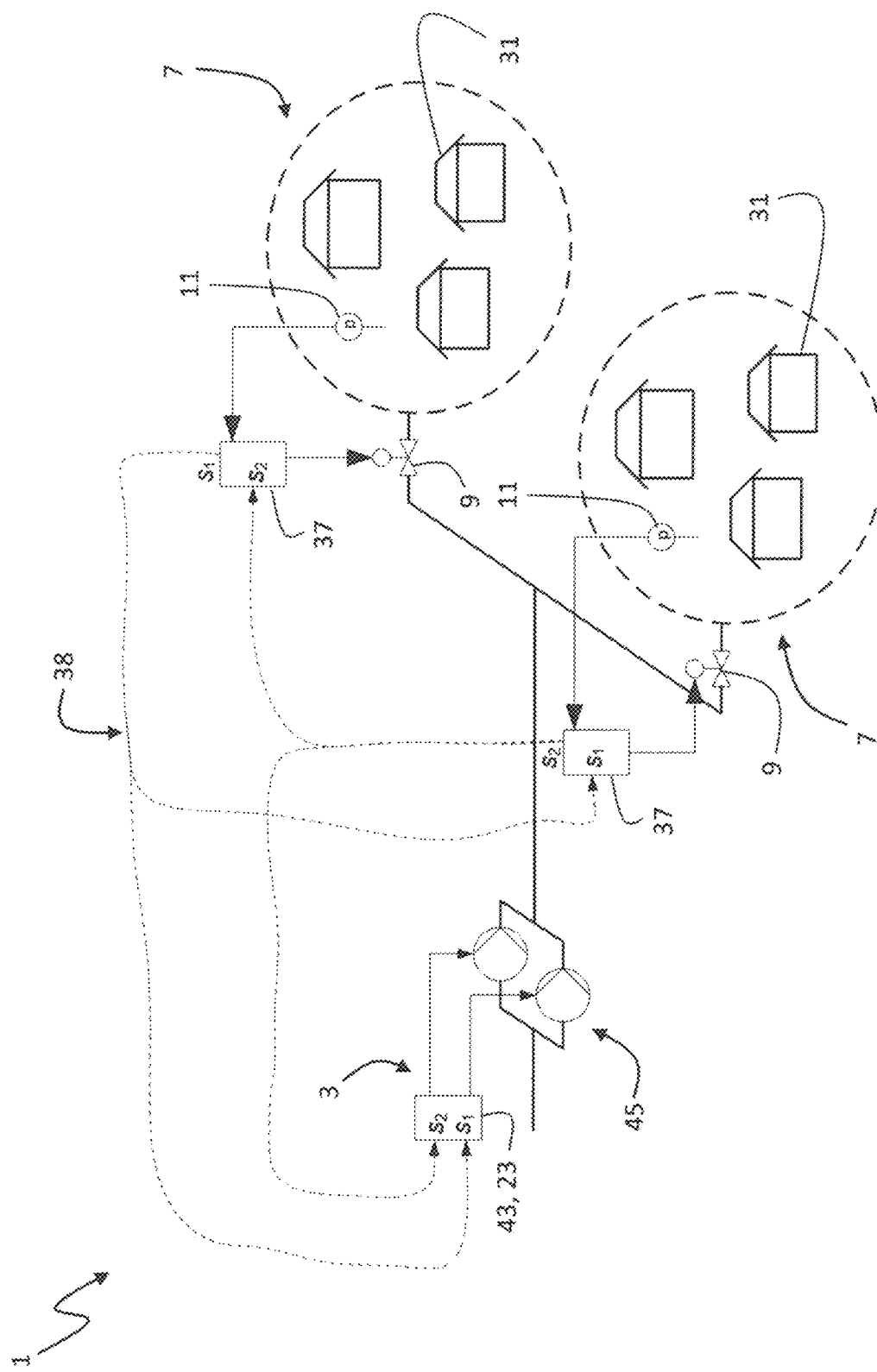
FIG. 22 is a schematic view of a water supply system as a fluid distribution system with a control system according to the present disclosure.

FIG. 22 shows schematically a water supply system 1 with a controls system according to the present disclosure. A pump station 45 in a feeder branch 2 acts as a source element for total water flow through the feeder branch 2 which feeds two pressure zones 7 being connected to the feeder branch 2 in parallel to each other. The pump station 45 acts also as a feeder branch regulating device. The water pressure in each pressure zone is measured by pressure sensors 11 and regulated by pressure reducing valves 9. There are consumer branch control units 37 for each pressure zone 7, wherein each consumer branch control unit 37 comprises both the saturation calculation module 21 and the saturation compensation module 23. Furthermore, a feeder branch control unit 43 with a saturation compensation module 23 is provided to influence the speed and/or power of the pumps in the pump station 45 depending on the saturation values $s_1$ and $s_2$ received from the consumer branch control units 37 as shown in FIG. 12. Thereby, both the total flow provided through the feeder branch 2 as well as the distribution of the total flow among the pressure zones 7 is adapted if a saturation situation occurs at one or both of the pressure zones 7.

The control system and method according to the present disclosure provides an automatic and dynamic solution to the problem of saturation situations occurring in fluid distribution system. The response of the control system is automatically and dynamically adapted in terms of timing and magnitude depending on the severity of the saturation situation. The more severe the saturation situation is, the quicker and more drastically the control system takes influence on the closed-loop controlling of the regulating devices in the system.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE NUMERALS 1 fluid distribution system
2 feeder branch
3 source element
5 feeder branch regulating device
7 consumer branch
9 consumer branch regulating device
11 sensor
12 bypass
13 check valve
15 return line of a consumer branch
17 feed line of a consumer branch
19 heat exchanger
21 saturation calculation module
23 saturation compensation module
25 saturation block
29 PI controller
31 consumer element
33 feed line pump
35 fan
37 consumer branch control unit
38 network
43 feeder branch control unit
45 feeder branch regulating device
47 feeder pump pressure sensor
51 feeder branch temperature sensor
53 chiller
55 feeder branch flow meter
57 feeder branch differential pressure sensor
59 temperature sensor(s)
60 feeder bypass
$s_i$ positive saturation value
$v_i$ negative saturation value
r reference value
r* altered reference value
u control value
y measured value
$u_{min, max}$ threshold value
$e_{min, max}$ threshold value
S weighted sum of positive saturation values $s_i$
V weighted sum of negative saturation values $v_i$
601 start-up of the control system
603 calculating a saturation signal
605 check if consumer branch is operational
607 set saturation value to zero

The invention claimed is:

1. A control system for controlling a fluid distribution system comprising at least two consumer branches arranged in parallel to each other, wherein each of the at least two consumer branches comprises at least one consumer element for consuming fluid and/or thermal energy, at least one consumer branch regulating device configured to receive a control value for regulating a flow of fluid and/or thermal energy through the associated consumer branch, and at least one sensor for providing a measured value of the associated consumer branch, the control system comprising:

a saturation calculation module configured to provide a saturation value for each operational consumer branch, wherein the saturation value is indicative of a saturation degree of an associated consumer branch; and a saturation compensation module configured to receive the saturation values and to alter a reference value, wherein the altered reference value is based on an initial reference value and the saturation values from the at least two consumer branches, such that the at least one consumer branch regulating device of each of the at least two consumer branches is controllable based on the altered reference value and the measured value of the associated consumer branch.

2. The control system according to claim 1, wherein at least one consumer branch regulating device is a pump or a regulating valve.

3. The control system according to claim 1, wherein at least one sensor is a temperature sensor, a pressure sensor, and/or a flow sensor.

4. The control system according to claim 1, wherein the consumer branch regulating device is configured to be closed loop controlled according to the control value.

5. The control system according to claim 1, wherein the saturation calculation module is configured to provide the saturation value for each operational consumer branch based on the measured value and/or the control value.

6. The control system according to claim 1, wherein each saturation value is based on an accumulation of deviations between a threshold value and the control value.

7. The control system according to claim 1, wherein a weighted sum of all saturation values represents a relative or an absolute amount, wherein the altered reference value differs from the initial reference value by said relative or said absolute amount.

8. The control system according to claim 1, wherein the saturation calculation module is configured to determine if at least one of the consumer branches is operational before providing a saturation value.

9. The control system according to claim 1, wherein the saturation calculation module comprises a consumer branch control unit at each of the consumer branches, wherein each consumer branch control unit is configured to communicate with all other consumer branch control units.

10. The control system according to claim 1, wherein the saturation compensation module comprises a consumer branch control unit at each of the consumer branches.

11. The control system according to claim 10, wherein:
the fluid distribution system further comprises a feeder branch comprising at least one source element for providing a total flow of fluid and/or thermal energy and at least one feeder branch regulating device for regulating the total flow of fluid and/or thermal energy through the feeder branch;
a sensor is provided in the feeder branch;
the feeder branch is arranged to feed the at least two consumer branches with fluid and/or thermal energy;
the saturation compensation module is implemented in a feeder branch control unit at the feeder branch; and
the feeder branch control unit is configured to receive the saturation values from consumer branch control units at each operational consumer branch, such that the at least one feeder branch regulating device is controllable based on the altered reference value and a value measured by the sensor in the feeder branch.

12. A system comprising:
a fluid distribution system comprising at least two consumer branches arranged in parallel to each other, each of the at least two consumer branches comprising:
at least one consumer element for consuming fluid and/or thermal energy;
at least one consumer branch regulating device configured to receive a control value for regulating a flow of fluid and/or thermal energy through the associated consumer branch; and
at least one sensor for providing a measured value of the associated consumer branch; and
a control system comprising:
a saturation calculation module configured to provide a saturation value for each operational consumer branch, wherein the saturation value is indicative of a saturation degree of an associated consumer branch; and
a saturation compensation module configured to receive the saturation values and to alter a reference value, wherein the altered reference value is based on an initial reference value and the saturation values from the at least two consumer branches, such that the at least one consumer branch regulating device of each of the at least two consumer branches is controllable based on the altered reference value and the measured value of the associated consumer branch.

13. A method for controlling a fluid distribution system, the method comprising the steps of:
consuming a fluid and/or thermal energy by at least one consumer element in each of at least two consumer branches arranged in parallel to each other;
regulating a flow of fluid and/or thermal energy through each of the consumer branches by at least one consumer branch regulating device in each consumer branch based on a control value of the associated consumer branch;
providing a measured value for each consumer branch by at least one sensor in each consumer branch;
determining a saturation value for each consumer branch, wherein the saturation value is indicative of the saturation degree of the associated consumer branch;
altering a reference value, wherein the altered reference value is based on an initial reference value and the saturation values from all consumer branches; and
controlling the at least one consumer branch regulating device of each consumer branch based on the altered reference value and the measured value of the associated consumer branch.

14. The method according to claim 13, wherein at least one of the consumer branch regulating devices is a pump or a valve.

15. The method according to claim 13, wherein the step of providing a measured value for each consumer branch comprises providing an absolute or differential temperature value, an absolute or differential pressure value, and/or an absolute or differential flow value.

16. The method according to claim 13, wherein determining the saturation value for each consumer branch is based on the measured value and/or the control value.

17. The method according to claim 13, wherein the step of regulating the flow of fluid and/or thermal energy through each of the consumer branches comprises closed-loop controlling the associated consumer branch regulating device according to the control value.

18. The method according to claim 13, wherein the step of determining the saturation value is based on an accumulation of deviations between a threshold value and the control value.

19. The method according to claim 13, wherein:
a weighted sum of all saturation values represents a percentage or an absolute amount; and
the altered reference value differs from the initial reference value by said percentage or said absolute amount.

20. The method according to claim 13, further comprising the step of determining if at least one of the consumer branches is operational before providing a saturation value.

21. The method according to claim 13, further comprising the steps of:
providing each of the consumer branches with a consumer branch control unit, wherein the step of determining the saturation value is carried out in the consumer branch control unit at each of the consumer branches; and each consumer branch control unit communicating with all other consumer branch control units.

22. The method according to claim 13, further comprising the step of providing each of the consumer branches with a consumer branch control unit wherein the step of controlling the at least one consumer branch regulating device is carried out in a consumer branch control unit at each of the consumer branches.

23. The method according to claim 13, further comprising the steps of:
  providing fluid and/or thermal energy by at least one source element in a feeder branch, wherein the feeder branch is arranged to feed each consumer branch with fluid and/or thermal energy;
  regulating a flow of fluid and/or thermal energy through the feeder branch by at least one feeder branch regulating device;
  receiving the saturation values from consumer branch control units at each operational consumer branch by a feeder branch control unit at the feeder branch; and
  controlling the at least one feeder branch regulating device based on the altered reference value and a value measured by a sensor in the feeder branch.

* * * * *